United States Patent
Mishima et al.

(10) Patent No.: US 7,098,959 B2
(45) Date of Patent: Aug. 29, 2006

(54) FRAME INTERPOLATION AND APPARATUS USING FRAME INTERPOLATION

(75) Inventors: Nao Mishima, Kanagawa-Ken (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 535 days.

(21) Appl. No.: 10/657,174

(22) Filed: Sep. 9, 2003

(65) Prior Publication Data

US 2004/0046891 A1   Mar. 11, 2004

(30) Foreign Application Priority Data

Sep. 10, 2002 (JP) ............................. 2002-264444
Jul. 16, 2003 (JP) ............................. 2003-197979

(51) Int. Cl.
*H04N 7/01* (2006.01)

(52) U.S. Cl. ...................................... 348/459; 348/443

(58) Field of Classification Search ................ 348/459, 348/443, 441, 451, 452, 699, 700, 701, 455, 348/448
See application file for complete search history.

(56) References Cited

U.S. PATENT DOCUMENTS

| | | | | |
|---|---|---|---|---|
| 5,982,441 A | * | 11/1999 | Hurd et al. | 348/417.1 |
| 5,982,444 A | * | 11/1999 | Kato et al. | 348/446 |
| 5,995,154 A | * | 11/1999 | Heimburger | 348/448 |
| 6,900,846 B1 | * | 5/2005 | Lee et al. | 348/459 |

FOREIGN PATENT DOCUMENTS

JP   2528103   8/1996
JP   2000-224593   8/2000

OTHER PUBLICATIONS

U.S. Appl. No. 10/657,174, filed Sep. 9, 2003, Mishima et al.
U.S. Appl. No. 10/806,180, filed Mar. 23, 2004, Itoh et al.
U.S. Appl. No. 10/808,319, filed Mar. 25, 2004, Mishima et al.
U.S. Appl. No. 10/855,617, filed May, 28, 2004, Mishima et al.

* cited by examiner

*Primary Examiner*—Michael H. Lee
(74) *Attorney, Agent, or Firm*—Oblon, Spivak, McClelland, Maier & Neustadt, P.C.

(57) ABSTRACT

A first motion vector is estimated by using a first frame and a second frame that follows the first frame. A support frame is generated from at least either the first or the second frame by using the first motion vector. The support frame is divided into a plurality of small blocks. Motion vector candidates are estimated by using the first and second frames, in relation to each of the small blocks. A small block on the first frame, a small block on the second frame and the small blocks on the support frame are examined. The small block on the first frame and the small block on the second frame correspond to each of the motion vector candidates. A second motion vector is selected from the motion vector candidates, and points the small block on the first frame and the small block on the second frame which have the highest correlation with each of the small blocks on the support frame. An interpolated frame is generated from at least either the first or the second frame by using the second motion vector.

19 Claims, 35 Drawing Sheets

FRAME INTERPOLATION AND APPARATUS USING FRAME INTERPOLATION

CROSS REFERENCE TO RELATED APPLICATIONS

This application is based upon and claims benefit of priority from the prior Japanese Patent Applications No. 264444 filed on Sep. 10, 2002 and No. 197979 filed on Jul. 16, 2003 in Japan, the entire contents of which are incorporated by reference.

BACKGROUND OF THE INVENTION

1. Field of Art

The present invention relates to a method of frame interpolation and an apparatus using the method of frame interpolation, for efficiently interpolating frames between successive frames of a reproduced moving-picture signal to increase the number of frames to be displayed per unit of time in reproduction of a moving-picture signal.

2. Related Art

In general, frame interpolation efficiently interpolates an additional frame between frames in a moving-picture signal carrying a plurality of frames, to increase the number of frames to be displayed per unit of time.

A recent frame interpolation technique is to produce a frame to be interpolated based on motion vectors obtained by block matching, one of fundamental technique in motion estimation.

Block matching is to detect motion vectors from a block in an image of a reference frame, the block having the highest correlation with small blocks of a base frame.

Such a frame interpolation technique is disclosed, for example, in Japanese Patent Laid-Open Publication 2000-224593.

The publication discloses intra-block area division based on block matching to aim at further accurate frame interpolation.

The known motion-compensated frame interpolation techniques perform motion compensation to image data pointed by a fixed terminal of a motion vector with respect to an initial point of the motion vector. The location of the initial point is, however, different from its original location due to motion-vector operations in interpolation. This causes a gap or superimposition in a frame to be interpolated.

Such a disadvantage is overcome by a technique disclosed in the Japanese Patent No. 2528103.

Disclosed in this patent is frame interpolation based on correlation between an anterior first frame and a posterior second frame. The correlation is geometrically found with a specific block of a frame to be interpolated as the center between the first and the second frame.

This frame interpolation technique requires no operations after obtaining motion vectors, different from the several known techniques described above, thus directly producing frames to be interpolated.

In addition, imaginary square grids on each frame to be interpolated in this frame interpolation technique do not cause a gap or superimposition in the frame to be interpolated, which otherwise occur like the above technique.

Nevertheless, this frame interpolation technique could assign an error motion vector in a still background, different from a motion vector to be assigned, due to relatively not so high correlation between objects in a first frame and a second frame.

This erroneous motion-vector assignment results in displaying the background on an image area on which the object should be displayed.

As discussed, one known motion-compensated frame interpolation technique is disadvantageous in causing a gap or superimposition in a frame to be interpolated.

The other known interpolation technique solving this problem is still disadvantageous in displaying a background on an image area on which an object should be displayed.

The known interpolation techniques therefore have difficulty in producing high-quality frames to be interpolated.

SUMMARY OF THE INVENTION

According to an aspect of the present invention, there is provided a frame interpolation method that includes estimating a first motion vector by using a first frame and a second frame that follows the first frame; generating a support frame from at least either the first or the second frame by using the first motion vector; dividing the support frame into a plurality of small blocks; estimating motion vector candidates by using the first and second frames, in relation to each of the small blocks; examining a small block on the first frame, a small block on the second frame and the small blocks on the support frame, the small block on the first frame and the small block on the second frame corresponding to each of the motion vector candidate; selecting a second motion vector from the motion vector candidates, the second motion vector pointing the small block on the first frame and the small block on the second frame which have the highest correlation with each of the small blocks on the support frame; and generating an interpolated frame from at least either the first or the second frame by using the second motion vector.

According to an aspect of the present invention, there is provided a frame interpolation method that includes: generating a support frame by using a first frame and a second frame that follows the first frame; dividing the support frame into a plurality of small blocks; estimating at least one motion-vector candidate group by recursive searching for motion-vector candidates in each small block of the support frame; examining the motion-vector candidate group by using the support frame, to obtain a first motion-vector group and a first unmatched-filter group; and generating an interpolated frame by motion compensation using the first motion-vector group, the first unmatched-filter group, and the first and second frames.

According to an aspect of the present invention, a frame interpolation method that includes: decoding a motion-compensated predictive signal to separate the signal into a video bitstream and motion-vector information; extracting a first and a second frame and a corresponding first motion vector from the video bitstream, thus generating a support frame from the first and second frames by using the first motion vector; estimating motion-vector candidates from the first and second frames in relation to each block in the support frame; examining an image block in the first frame and an image block in the second frame, and an image block in the support frame, to select one of the motion vector candidates as a second motion vector having the highest correlation; and generating an interpolated frame from image blocks, in the first and second frames, determined by the second motion vector.

DETAILED DESCRIPTION OF EMBODIMENT

Several embodiments according to the present invention will be disclosed with reference to the attached drawings.

First Embodiment

A method of frame interpolation, a first embodiment of the present invention, will be disclosed with reference to FIGS. 1 to 11.

Figure 1:
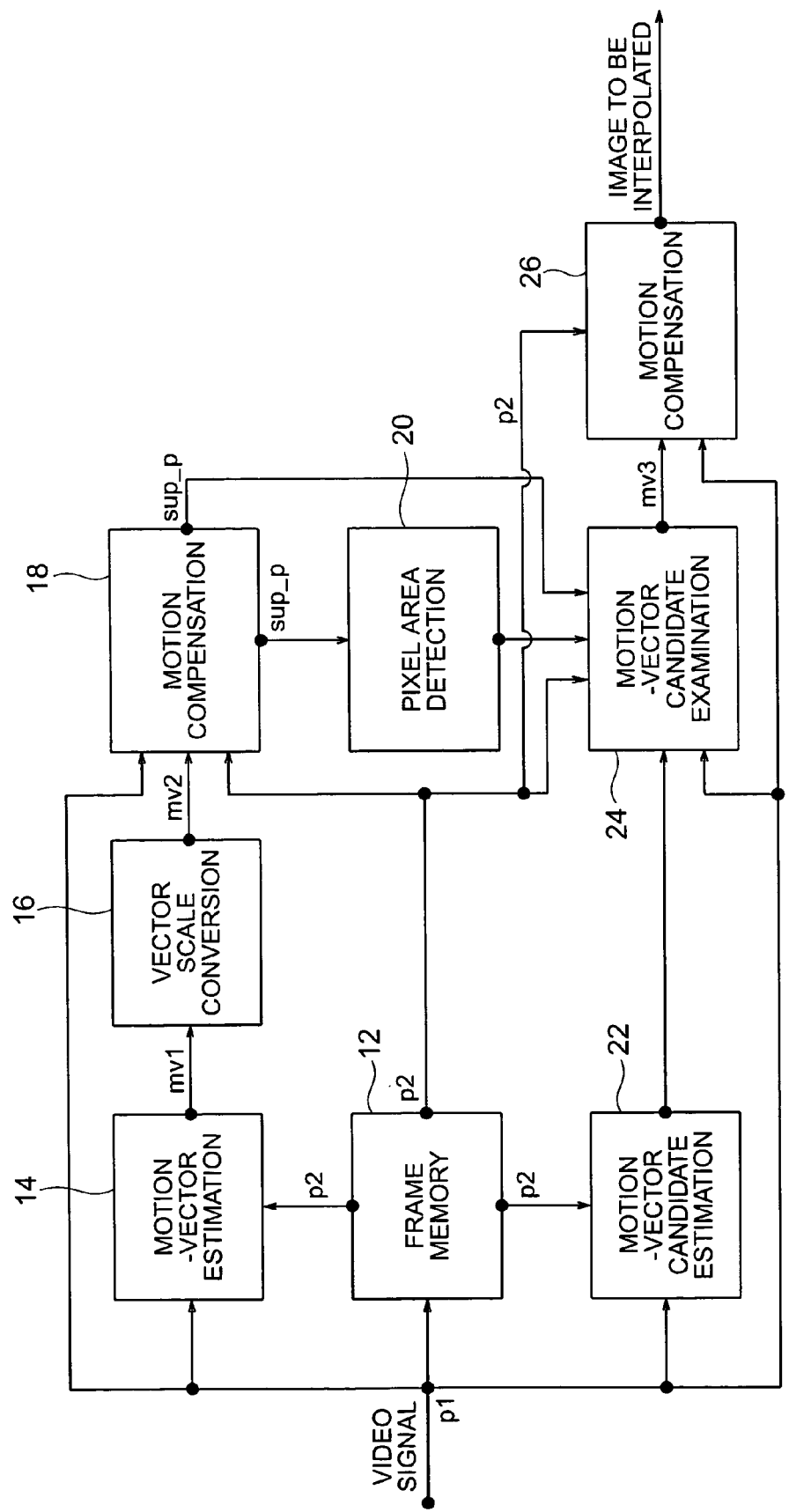
FIG. 1 is a block diagram of a frame interpolation apparatus used in a first embodiment of a frame interpolation method according to the present invention.

Shown in FIG. 1 is a frame interpolation apparatus that executes the first embodiment of frame interpolation.

The frame interpolation apparatus shown in FIG. 1 is equipped with a frame memory 12, a motion-vector estimator 14, a motion-scale converter 16, a motion compensator 18, a pixel area detector 20, a motion-vector candidate estimator 22, a motion-vector candidate examiner 24, and another motion compensator 26.

The first embodiment of frame interpolation will be disclosed in up-converting a 60-Hz non-interlaced video signal into a 120-Hz non-interlaced video signal, although this invention is not limited to this application.

Reference signs p1 and p2 shown in FIG. 1 indicate a first reference frame and a second reference frame, respectively, of an input video signal. The first reference frame p1 is an anterior frame and the second reference p2 is a posterior frame that follows the first reference frame. Interposed between these frames is an interposed frame which will be generated by the frame interpolation apparatus.

The first reference frame p1 is supplied to the frame memory 12, the motion-vector estimator 14, the motion compensator 18, the motion-vector candidate estimator 22, the motion-vector candidate examiner 24, and also the motion compensator 26.

The second reference p2 is produced and stored at the frame memory 12, based on the input video signal.

Figure 2:
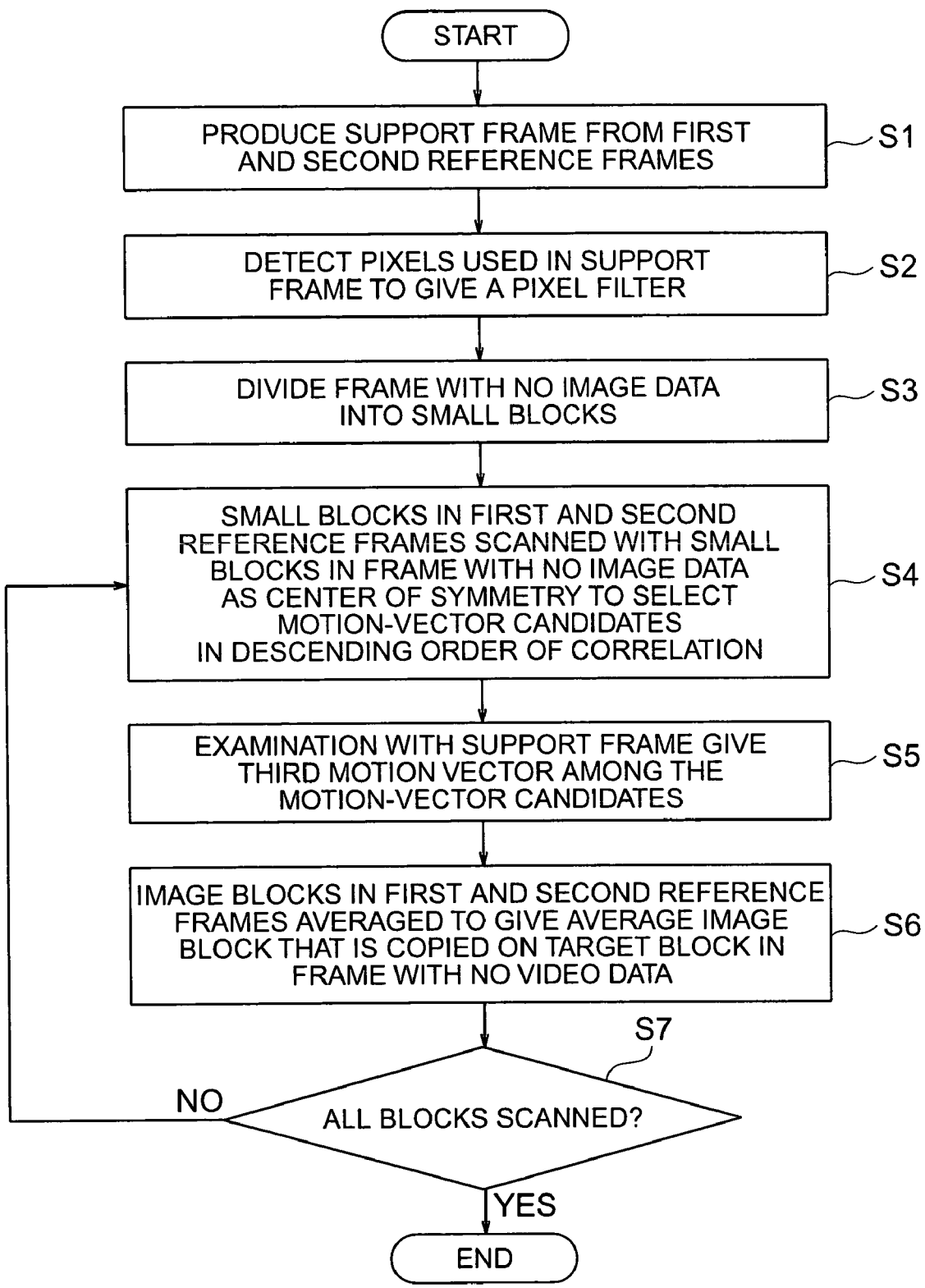
FIG. 2 is a flow chart showing an overall frame interpolation procedure in the first embodiment of frame interpolation method.

Shown in FIG. 2 is an overall frame interpolation procedure.

Produced first in step S1 is a support frame sup-p from the first and second reference frames p1 and p2. The support frame production is performed by the motion-vector estimator 14, the motion-scale converter 16, and the motion compensator 18 shown in FIG. 1, according to a flow chart shown in FIG. 3.

a) Motion Estimation Procedure

A motion estimation procedure is performed by the motion-vector estimator 14 shown in FIG. 1.

Figure 3:
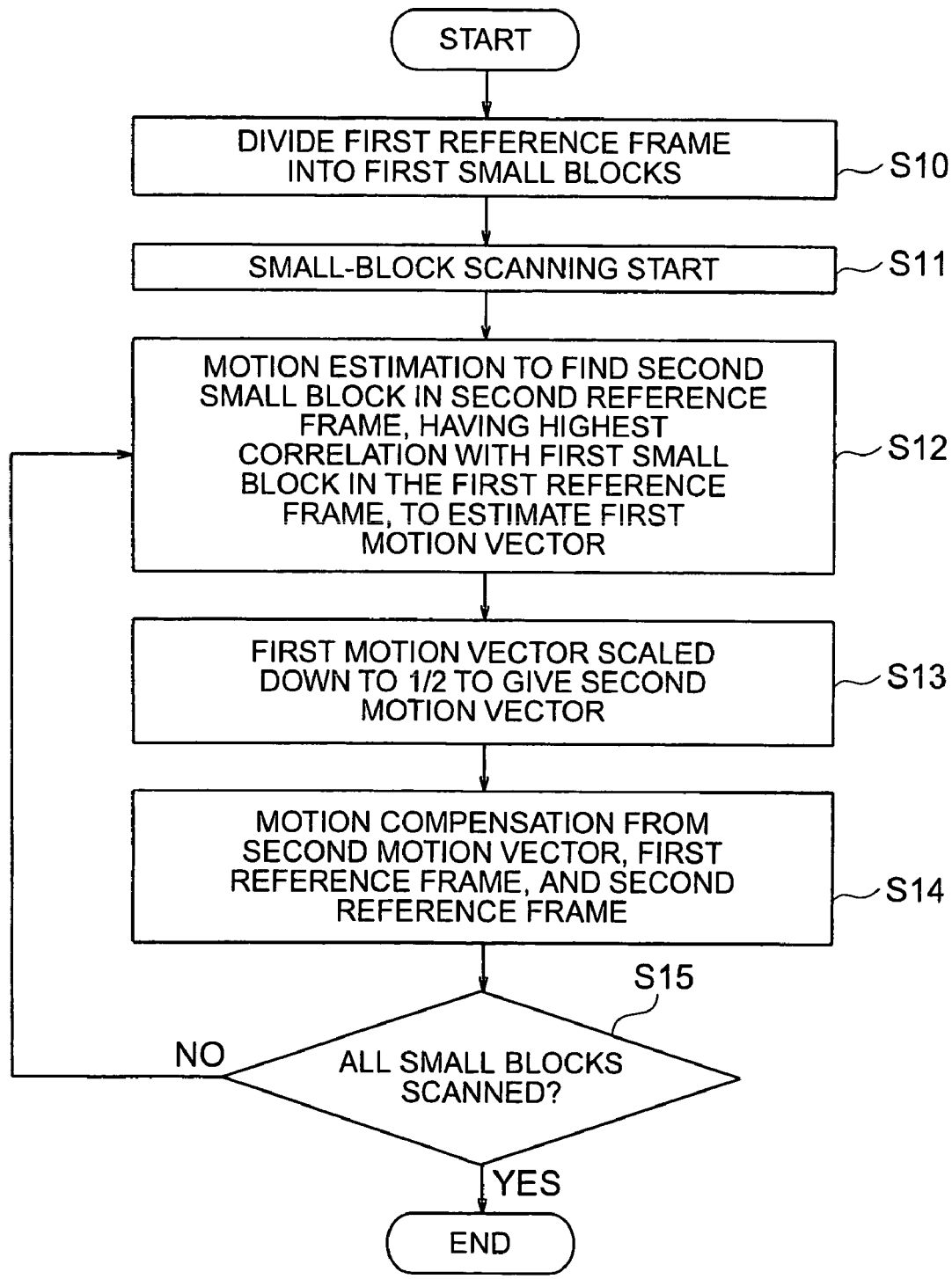
FIG. 3 is a flow chart showing a support-frame production procedure.
Figure 7:
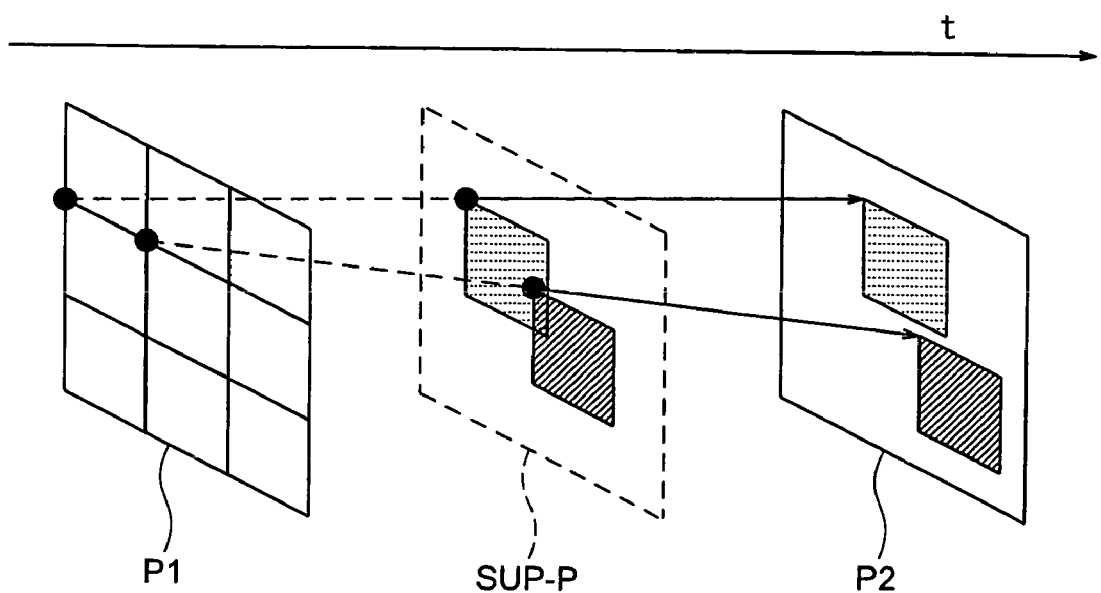
FIG. 7 is an illustration showing a motion estimation procedure according to the first embodiment.

As illustrated in FIG. 7, the first reference frame p1 is divided into first small blocks of square grids in step S10 in FIG. 3.

Small-block scanning starts (step S11). Motion estimation is then executed to find a second small block in the second reference frame p2, having the highest correlation with one of the first small blocks in the first reference frame p1, thus estimating a first motion vector mv1 (step S12).

The step S12 may be executed in accordance with an algorism of block matching with SAD (Sum of Absolute Difference) for correlation. A smaller SAD gives a higher correlation.

The motion estimation employed in this embodiment is forward motion estimation for estimating a motion vector to the posterior second reference frame p2 from the anterior first reference frame p1.

An alternative to the forward motion estimation in this embodiment is, for example, backward motion estimation for estimating a motion vector to the anterior first reference frame p1 from the posterior second reference frame p2.

Another alternative is, for example, bi-directional motion estimation in which a higher reliable result of either the forward or the backward motion estimation is selected.

b) Vector-Scale Conversion Procedure

A vector-scale conversion procedure is performed by the vector-scale converter 16 shown in FIG. 1. The length of the first motion vector mv1 is scaled down to ½ to obtain a second motion vector mv2, to generate a support frame in the middle of a 60-Hz signal (step S13 in FIG. 3).

c) First Motion-Compensation Procedure

Figure 8:
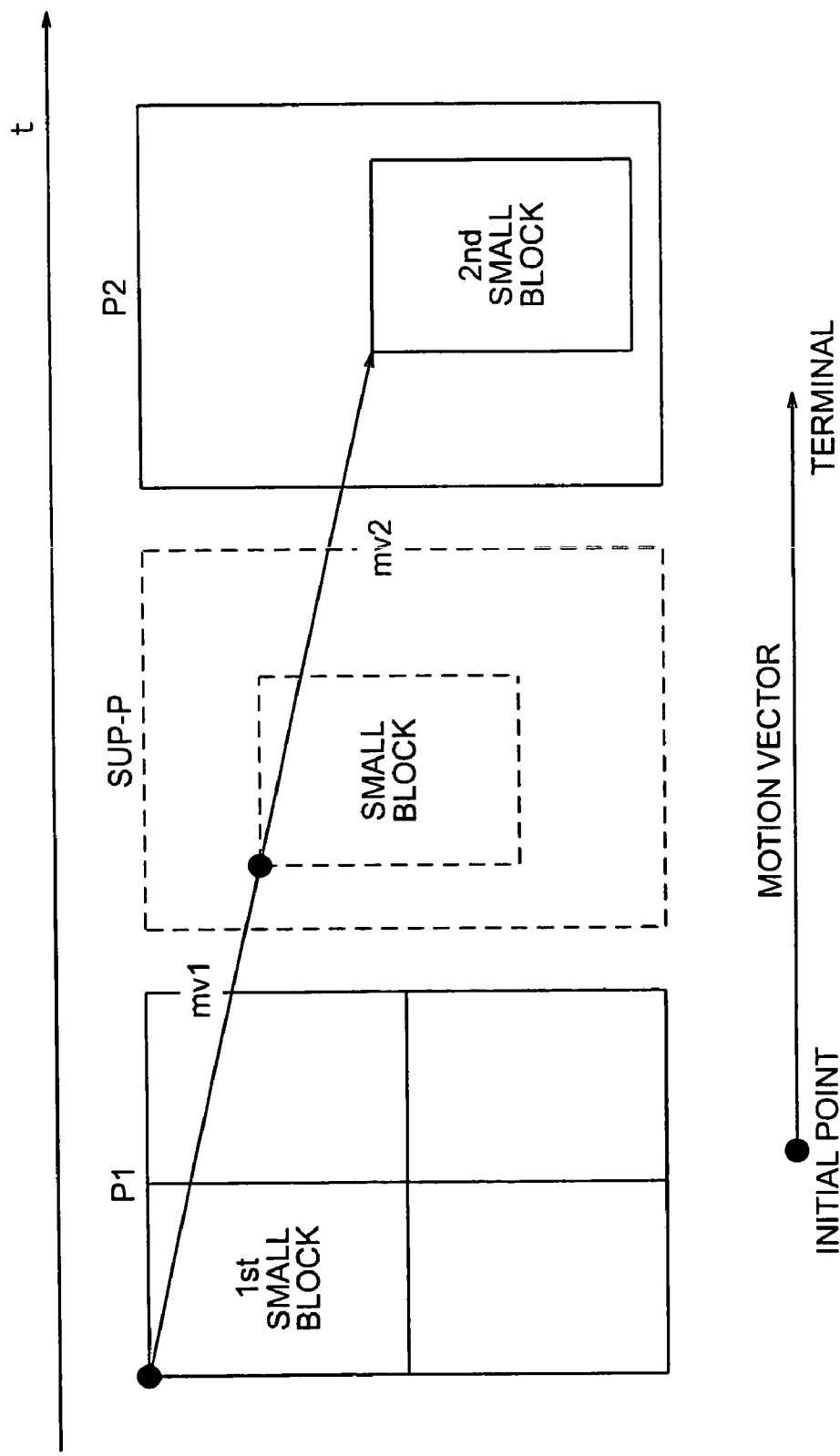
FIG. 8 is an illustration showing a positional relationship among blocks in support-frame production.

A first motion-compensation procedure is performed by the first motion compensator 18 shown in FIG. 1. As illustrated in FIG. 8, in the first motion-compensation procedure, a first small image block in the first reference frame p1 and a second small block image in the second reference frame p2 are averaged to obtain an average image. The second small block is determined by the terminal of the second motion vector mv2. The average image block is then copied on a small block in the support frame sup-p (step S14 in FIG. 3). The small block is determined by the initial point of the second motion vector mv2.

Figure 10:
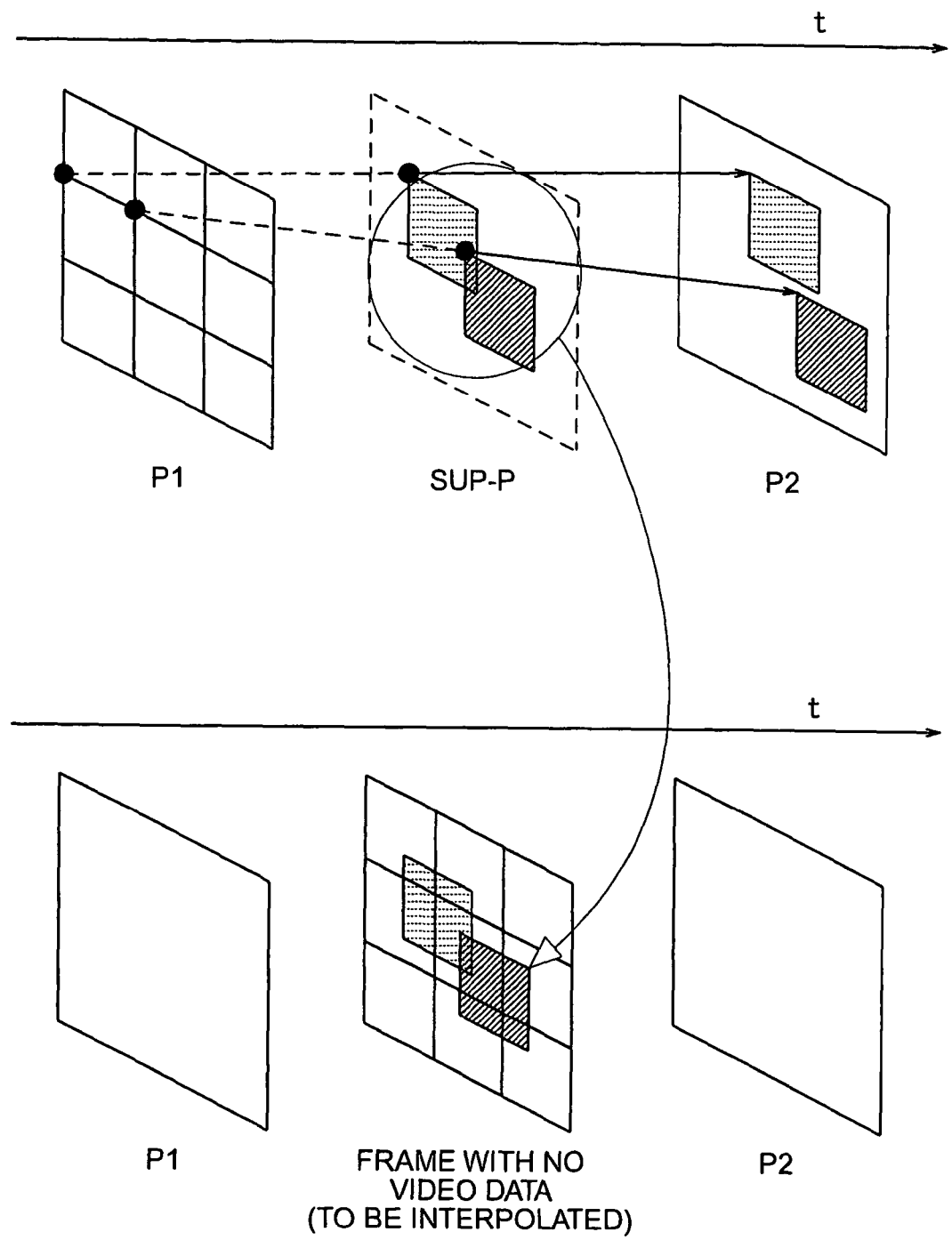
FIG. 10 is an illustration showing a relationship between a support frame and a frame to be interpolated.

The procedures a) to c) are performed for all of the first small blocks divided in the procedure a) in step S15 in FIG. 3, to generate the support-frame sup-p, as illustrated in FIG. 7. Illustrated in FIG. 10 is the relationship between the generated support frame sup-p and a target frame to be interpolated.

d) Pixel Area Detection Procedure

A pixel area detection procedure is performed by the pixel area detector 20 shown in FIG. 1.

Figure 4:
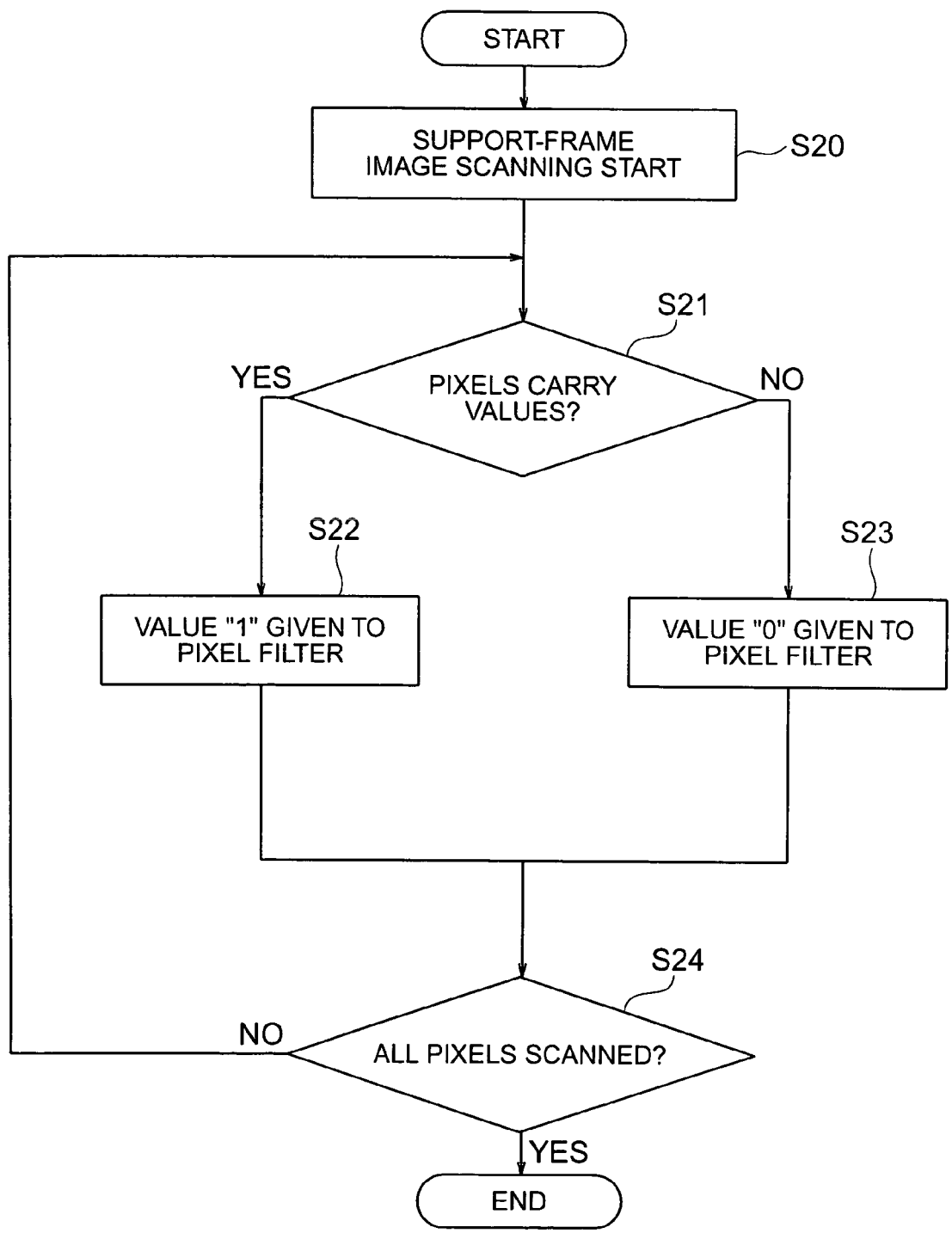
FIG. 4 is a flow chart showing a pixel filter production procedure.

The detection of an area of used pixels is to obtain a pixel filter (step S2 in FIG. 2), in accordance with a flow chart shown in FIG. 4.

Detected in steps S20 and S21 are pixels stored no pixel values in the support frame. The value "0" is given to each of these pixels stored no pixel values (step S23) whereas the value "1" to each of the other pixels (step S22).

These steps are performed for all pixels to obtain the pixel filter (step S24).

e) Motion-Vector Candidate Estimation Procedure

A motion-vector candidate estimation procedure is performed by the motion-vector candidate estimator 22 shown in FIG. 1.

Figure 9:
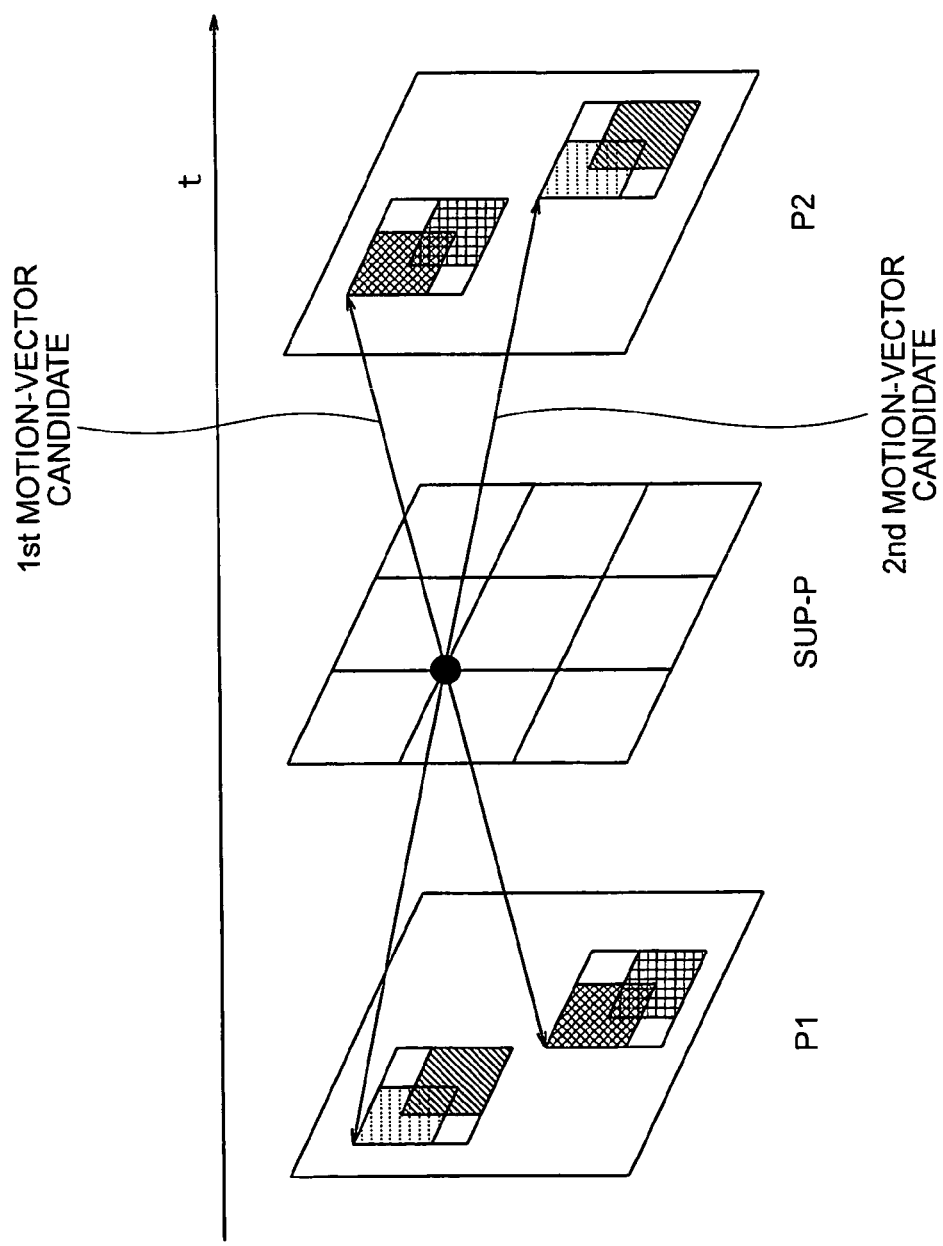
FIG. 9 is an illustration showing a motion-vector candidate estimation procedure.

As illustrated in FIG. 9, in the motion-vector candidate estimation procedure, a frame with no video data located between the first and second reference frames is divided into small blocks of square grids (step S3 in FIG. 2). The frame with no video data is converted into a frame to be interpolated through the procedures described below.

Calculated from the first and second reference frames p1 and p2 is correlation between small blocks geometrically symmetrical with each other in theses reference frames, with the small blocks of the frame with no video data interposed therebetween, as the center of symmetry. Several vectors are then selected as motion-vector candidates in descending order of correlation (step S4 in FIG. 2).

f) Motion-Vector Candidate Examination Procedure

A motion-vector candidate examination procedure is performed by the motion-vector candidate examiner 24 shown in FIG. 1.

The motion-vector candidate examination procedure is performed with determination of a third motion vector mv3 among the motion-vector candidates, using the support frame sup-p as reference information (step S5 in FIG. 2).

Figure 5:
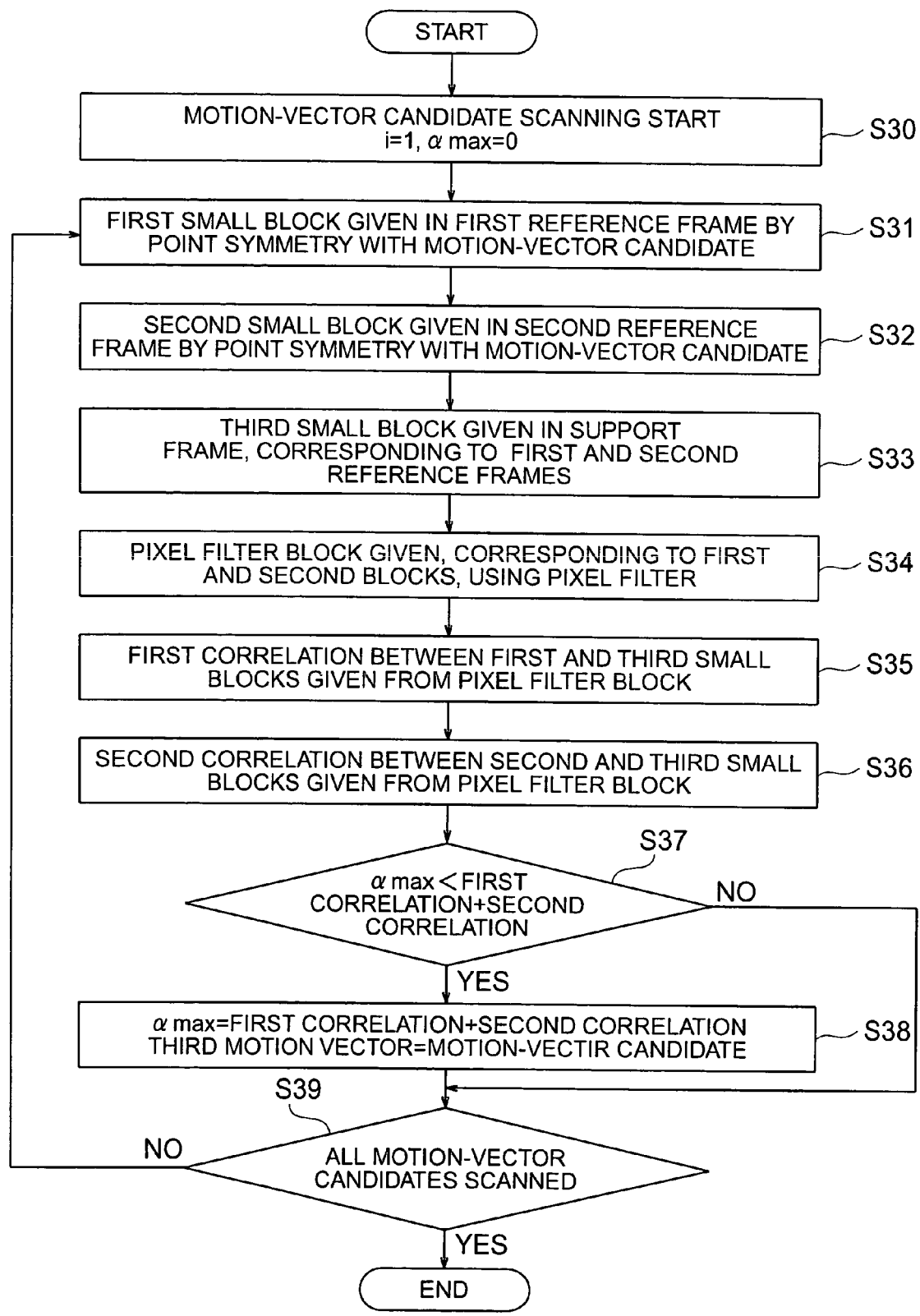
FIG. 5 is a flow chart showing a motion-vector candidate examination procedure according to the first embodiment.

The third motion vector mv3 is determined in accordance with a flow chart shown in FIG. 5.

The value "0" is substituted for $\alpha$max to find out the maximum correlation value $\alpha$max (step S30). Obtained next are a first small block in the first reference frame p1 and a second small block in the second reference frame p2, each determined from one of the selected motion-vector candidates (steps S31 and S32). Also obtained is a third small block in the support frame sup-p corresponding to the first and second small blocks (step S33).

Obtained next is a pixel filter block corresponding to the first and second small blocks, using the pixel filter (step S34).

Obtained using the pixel filter block are a first correlation between the first and the third block and also a second correlation between the second and the third block (steps S35 and S36).

The computation to obtain the first and second correlations could have a problem of extremely low correlation on pixels stored no pixel values in the support frame sup-p if the pixel filter is not used. This is the reason why the pixel filter obtained in the pixel area detection procedure is used.

Figure 6:
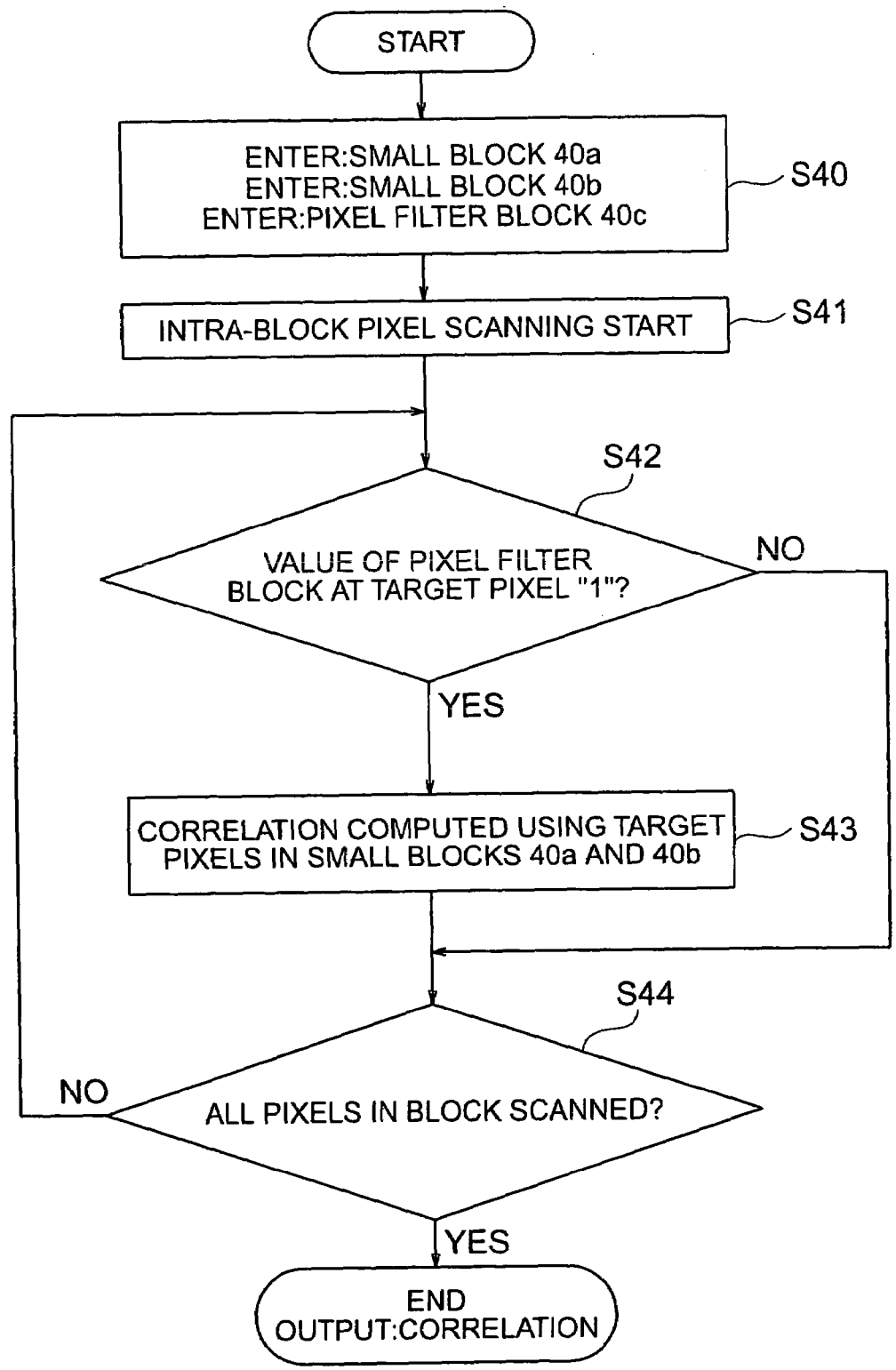
FIG. 6 is a flow chart showing a correlation computation procedure using a pixel filter.

In detail, the correlations are computed in accordance with a flow chart shown in FIG. 6.

Entered in step S40 are a first small block 40a, a third small block 40b, and a pixel filter block 40c.

Intra-block pixel scanning starts in step S41. It is then determined whether or not the value of a pixel filter block at a target pixel is "1" (step S42).

If the value of the pixel filter block is "1" (YES in step S42), the procedure moves onto step S43 to perform correlation computation using target pixels in the small blocks 40a and 40b, and then the procedure moves onto step S44. In contrast, if the value of the pixel filter block is "0" (NO in step S42), the procedure directly moves onto step S44.

It is determined in step S44 whether or not all pixels in the block have been scanned. If not scanned (NO in step S44), the procedure returns to step S42 to repeat the following steps. On the contrary, if all pixels have been scanned (YES in step S44), the procedure ends and the computed correlations are output.

In this procedure, a target pixel is not used in correlation computation if the value of a pixel filter at the target pixel is "0". In other words, pixels used in correlation computation are only those at which the value of each pixel filter block is "1".

Referring to FIG. 5 again, the first and second correlations are added to each other and it is determined whether or not the result of addition is larger than the maximum correlation value αmax (step S37).

If larger (YES in step S37), the procedure moves onto step S38 in which the result of addition is substituted for αmax and a motion vector at this αmax is given as the third motion vector mv3. The procedure then moves onto step S39. If not larger or equal (NO in step S37), however, the procedure directly moves onto step S39.

It is determined in step S39 whether or not all motion-vector candidates in a target small block have been scanned. If not (NO in step S39), the procedure returns to step S31 to repeat the succeeding steps. In contrast, if all motion-vector candidates have been scanned (YES in step S39), the motion-vector candidate examination procedure ends.

Figure 11:
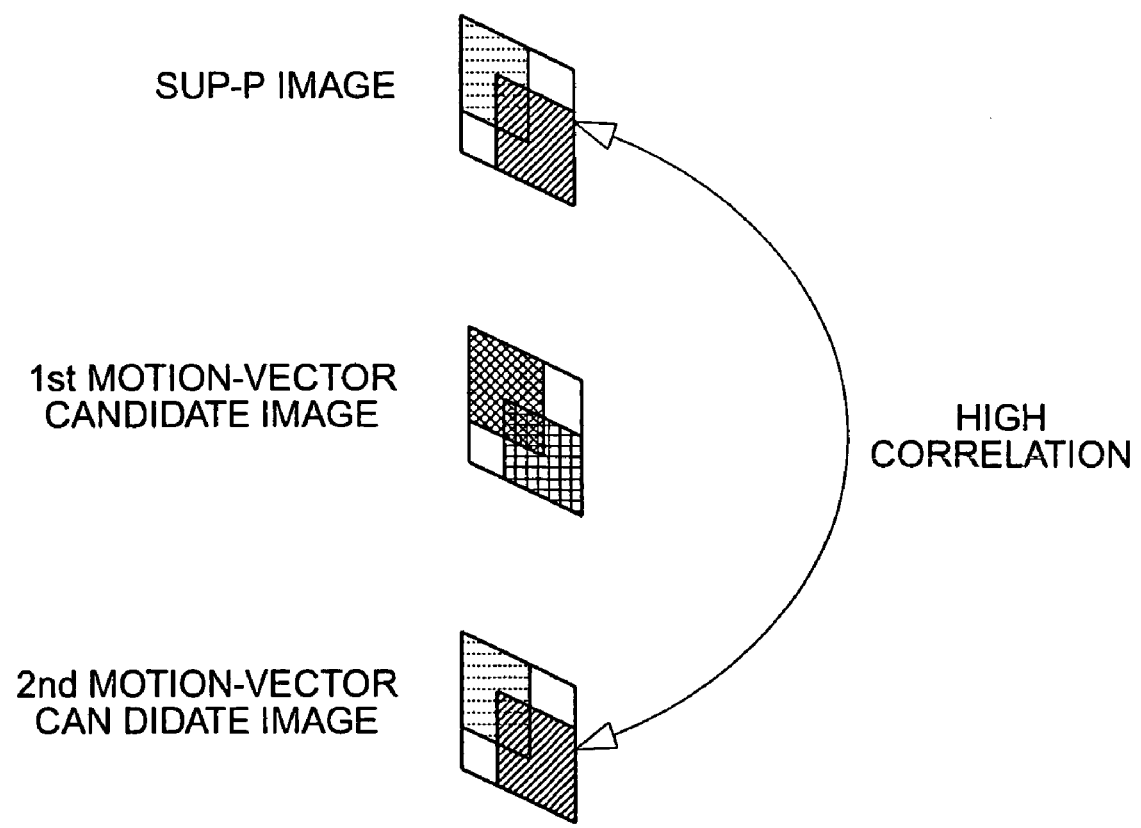
FIG. 11 is an illustration showing a motion-vector candidate examination procedure.

As disclosed above, this procedure is applied to all motion-vector candidates in a target block to obtain correlations, and one of the candidates having the highest correlation is output as the third motion vector mv3, as illustrated in FIG. 11.

g) Second Motion-Compensation Procedure

A second motion-compensation procedure is performed by the second motion compensator 26 shown in FIG. 1.

In step S6 shown in FIG. 2, an image block in the second reference frame p2 and another image block in the first reference frame p1 are averaged to obtain an average image block. The former image block is determined by the terminal of the third motion vector mv3. The latter image block is determined according to the location of a point that has a point symmetrical relationship with the terminal of the third motion vector mv3. The average image block is copied on a target small block in the frame with no video data.

The procedure moves onto step S7 in FIG. 2 to determine whether or not all small blocks have been scanned. If not (NO in step S7), the procedure returns to step S4 to repeat the succeeding steps. If all small blocks have been scanned (YES in step S7), production of one frame to be interpolated is finished.

Accordingly, one frame to be interpolated is generated through the procedures from e) to g) for all small blocks divided in the procedure e).

As disclosed above, in the first embodiment, a support frame is obtained first and a frame to be interpolated is then obtained based on the support frame.

Therefore, the first embodiment is advantageous in interpolating high-quality frames to be interpolated, freeing from a gap or superimposition, and also from a background displayed on an image area on which an object should be displayed.

Second Embodiment

A method of frame interpolation, a second embodiment of the present invention, will be disclosed with reference to FIGS. 12 to 28.

Figure 12:
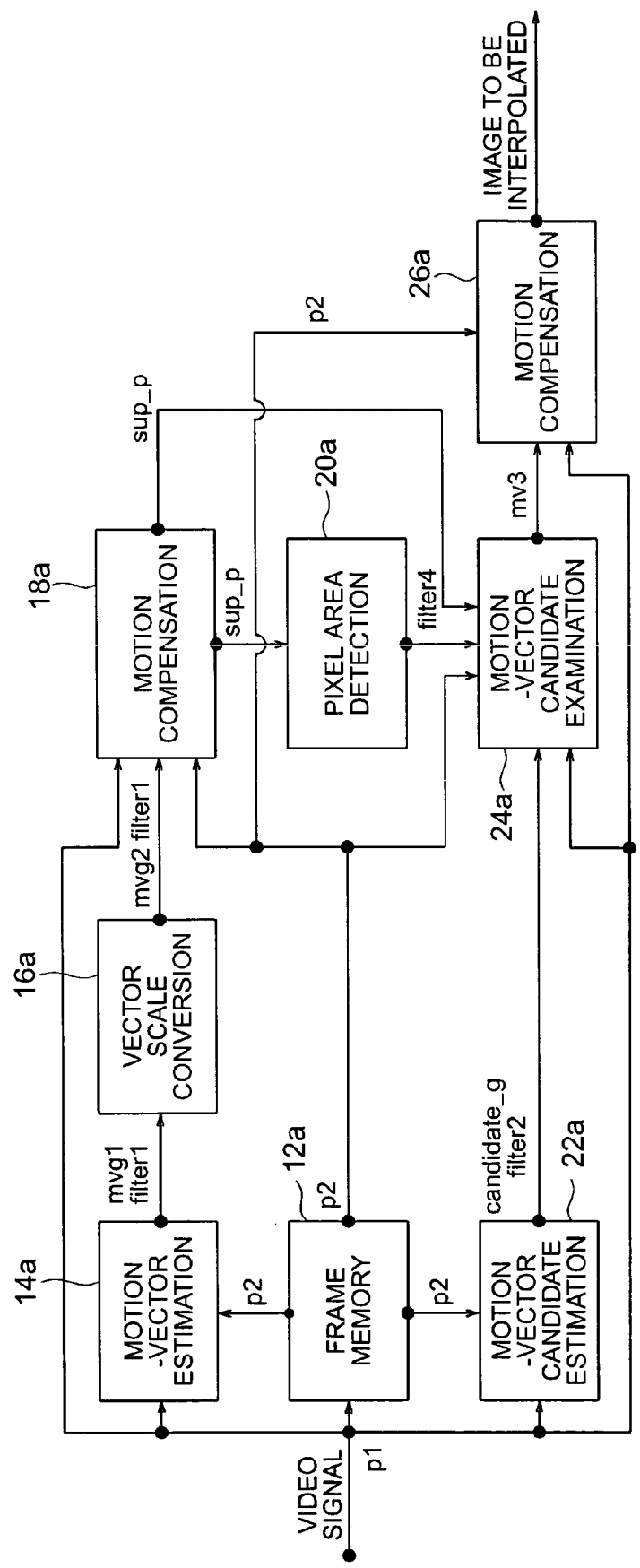
FIG. 12 is a block diagram of a frame interpolation apparatus used in a second embodiment of a frame interpolation method according to the present invention.

Shown in FIG. 12 is a frame interpolation apparatus that executes the second embodiment of frame interpolation.

The frame interpolation apparatus shown in FIG. 12 is equipped with a frame memory 12a, a motion-vector estimator 14a, a motion-scale converter 16a, a motion compensator 18a, a pixel area detector 20a, a motion-vector candidate estimator 22a, a motion-vector candidate examiner 24a, and another motion compensator 26a.

The second embodiment of frame interpolation will be disclosed in up-converting a 60-Hz non-interlaced video signal into a 120-Hz interlaced video signal, although this invention is not limited to this application.

Reference signs p1 and p2 shown in FIG. 12 indicate a first reference frame and a second reference frame, respectively, of an input video signal. The first reference frame p1 is an anterior frame and the second reference p2 is a posterior frame that follows the first reference frame. Interposed between these frames is a frame to be interpolated.

The first reference frame p1 is supplied to the frame memory 12a, the motion-vector estimator 14a, the motion compensator 18a, the motion-vector candidate estimator 22a, the motion-vector candidate examiner 24a, and also the motion compensator 26a.

The second reference p2 is produced and stored at the frame memory 12a, based on the input video signal.

Figure 13:
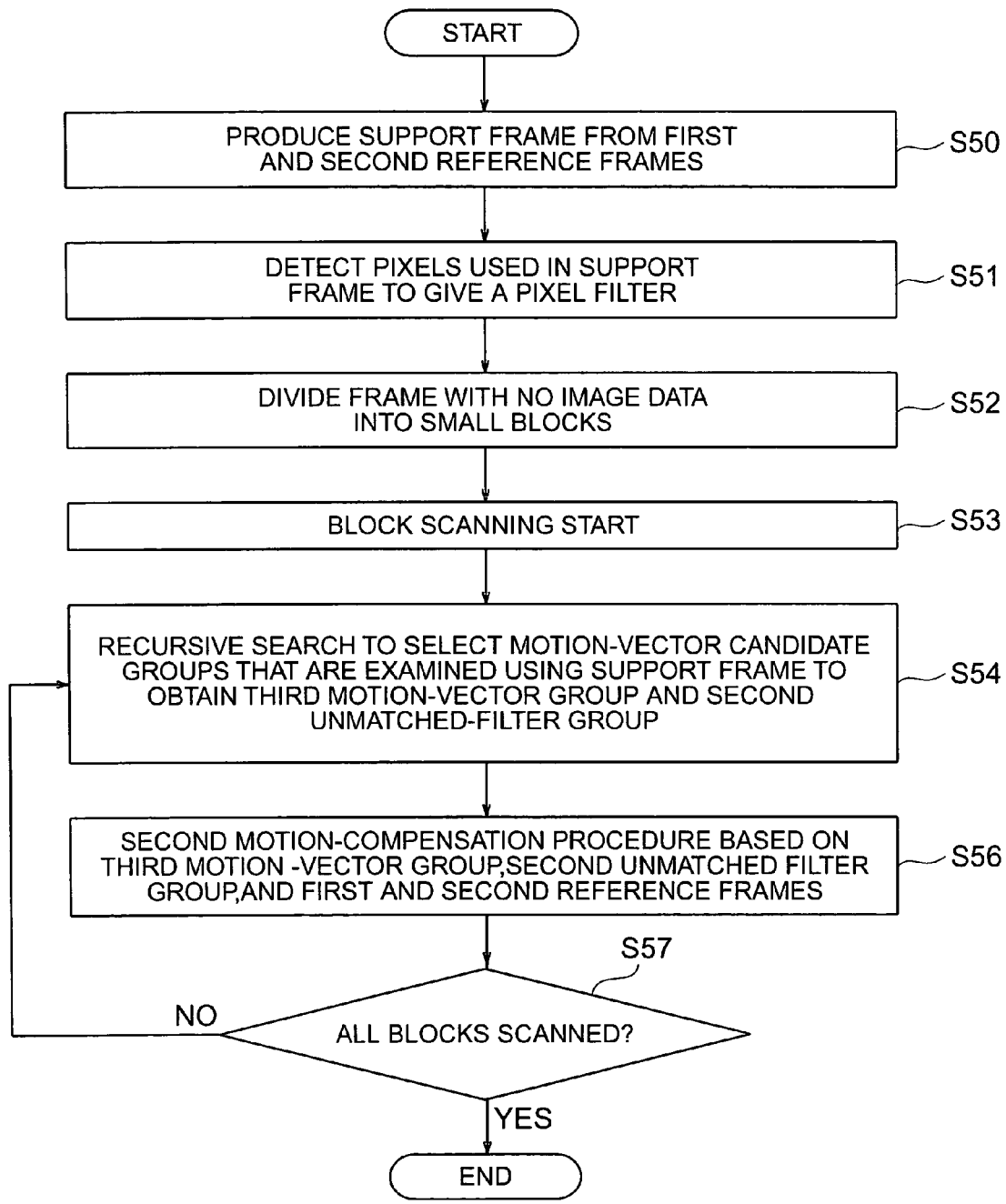
FIG. 13 is a flow chart showing an overall frame interpolation procedure in the second embodiment of the frame interpolation method.

Shown in FIG. 13 is an overall frame interpolation procedure.

Produced first in step S50 is a support frame sup-p from the first and second reference frames p1 and p2. The support frame generation is performed by the motion-vector estimator 14a, the motion-scale converter 16a, and the motion compensator 18a shown in FIG. 12, according to a flow chart shown in FIG. 14.

a) Motion Estimation Procedure

A motion estimation procedure is performed by the motion-vector estimator 14a shown in FIG. 12.

Figure 14:
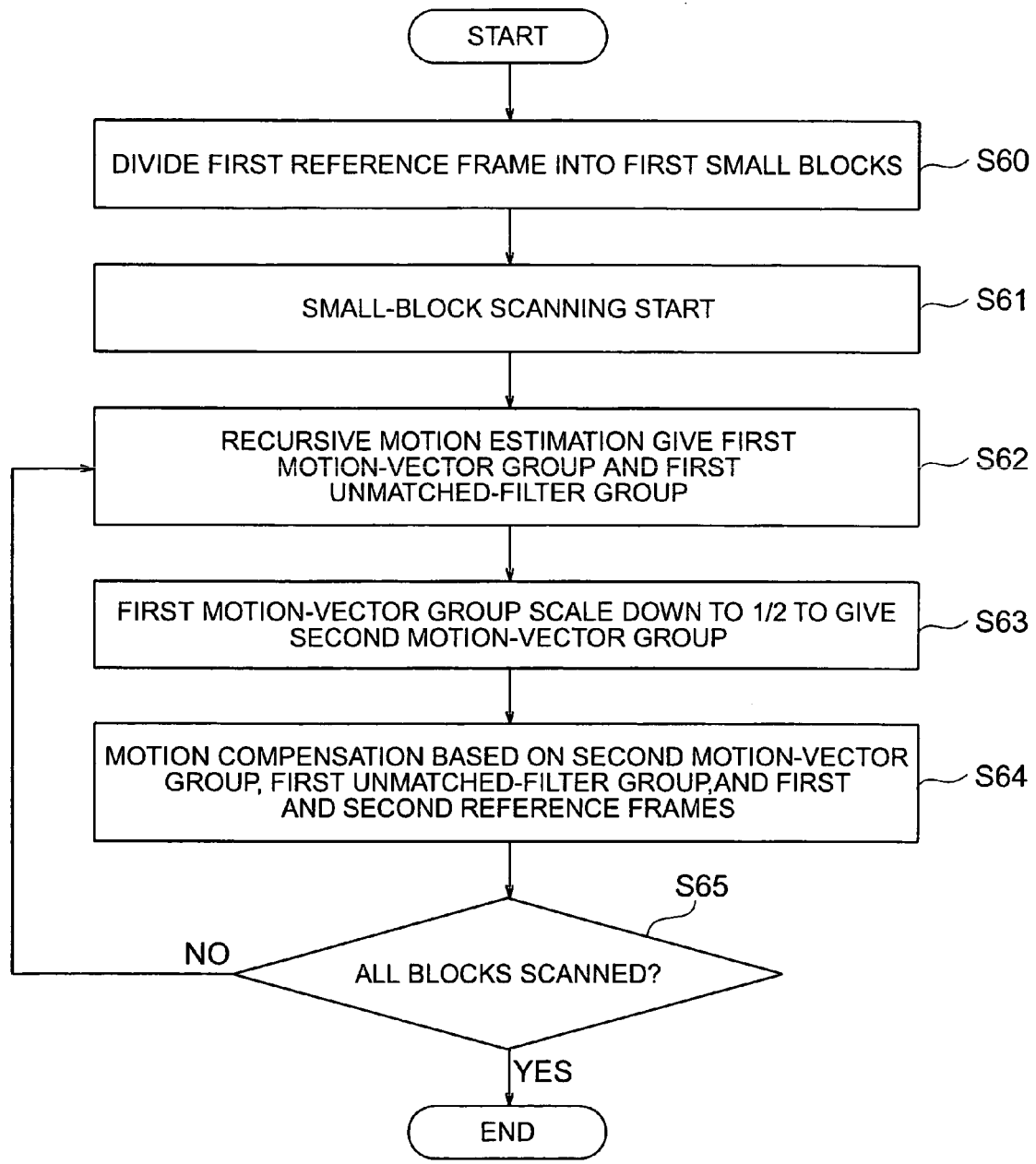
FIG. 14 is a flow chart showing a support-frame production procedure according to the second embodiment.

The first reference frame p1 is divided into first small blocks of square grids in step S60 in FIG. 14.

Figure 18:
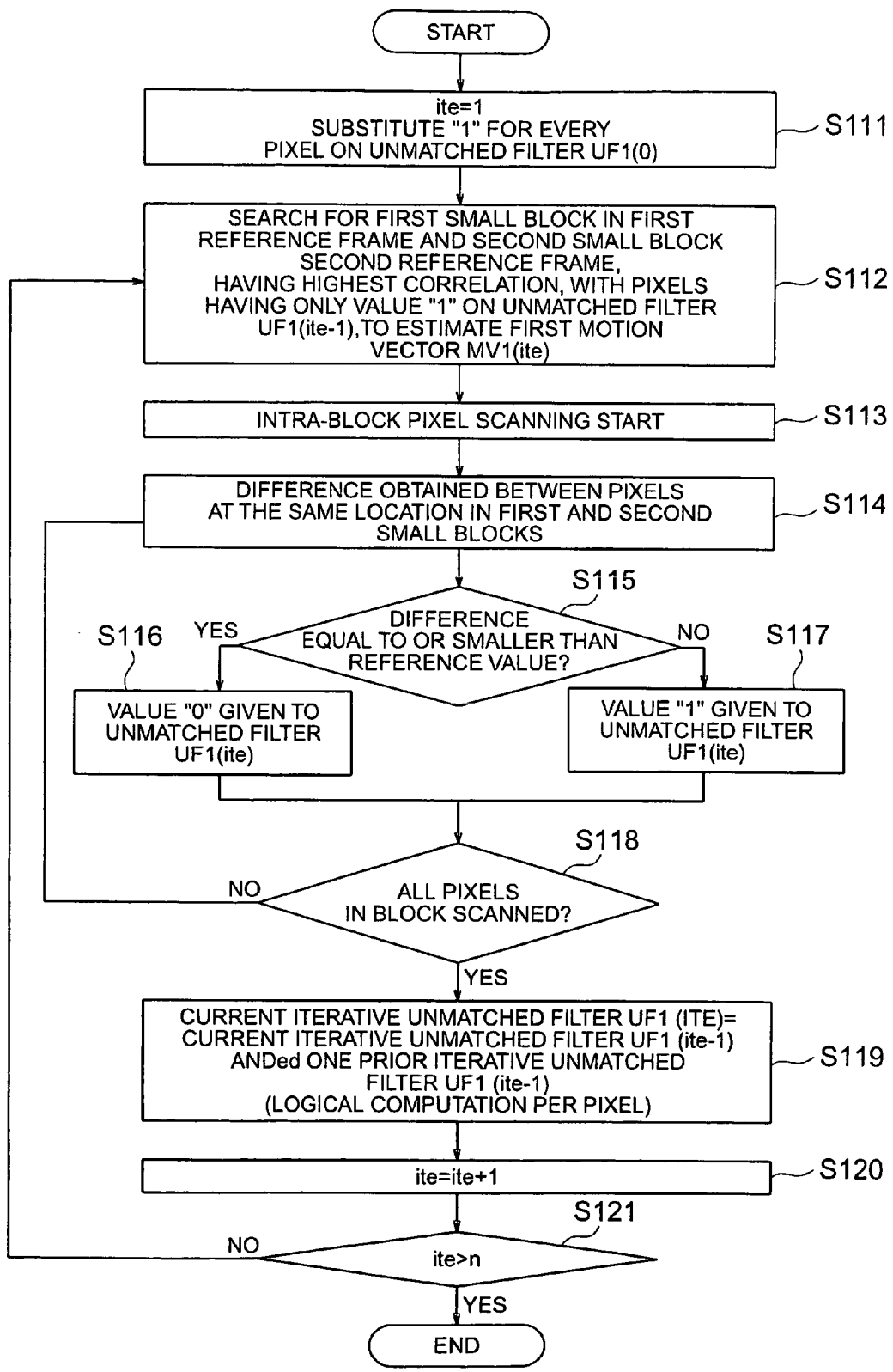
FIG. 18 is a flow chart showing a recursive motion examination procedure in the second embodiment.

Recursive motion estimation is applied to the first small blocks to obtain first motion-vector group mvg1 and a first unmatched-filter group filter1 (steps S61 and S62).

a1) The recursive motion estimation is performed in accordance with a flow chart shown in FIG. 18.

The initial step is to substitute "1" for a variable ite while "1" has already been substituted for every pixel in an initial unmatched filter UF1(0), in step S111.s Found out in step S112 are a first small block in the first reference frame p1 and also a second small block in the second reference frame p2, having the highest correlation, using only pixels having value "1" on an unmatched filter UF1(ite−1), thus estimating a first motion vector MV1(ite).

Figure 20:
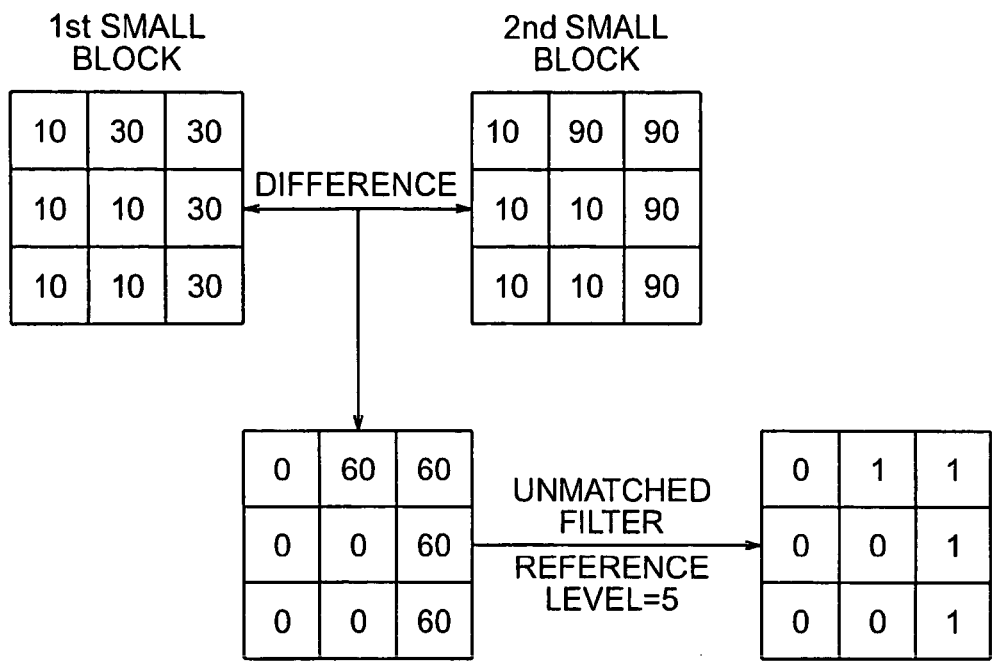
FIG. 20 is an illustration explaining determination of matched and unmatched pixels.

Sum of absolute difference (SAD) may be used for correlation. Sum of matched number of pixels, however, enhances accuracy. The latter is to obtain a difference between pixels at the same location in a first and a second small block to determine that the larger the number of matched pixels, the higher the correlation for matched pixels. A difference between the matched pixels is equal to or smaller than a reference value, against unmatched pixels, a difference therebetween being larger than the reference value.

a2) Obtained further in steps S113 and S114 is a difference between pixels at the same location in a first small block and a second small block determined by the first motion vector MV1(ite), as illustrated in FIG. 20.

The value "0" at matched pixels having a difference therebetween equal to or smaller than a reference, or "1" (integer) at unmatched pixels having a difference therebetween larger than the reference value, is given to an unmatched filter UF1(ite) having the same size as the first small block (steps S115, S116, and S117).

a3) The next step is to recursively search for a second small block in the second reference frame p2, having the highest correlation with the first small block.

Figure 21:
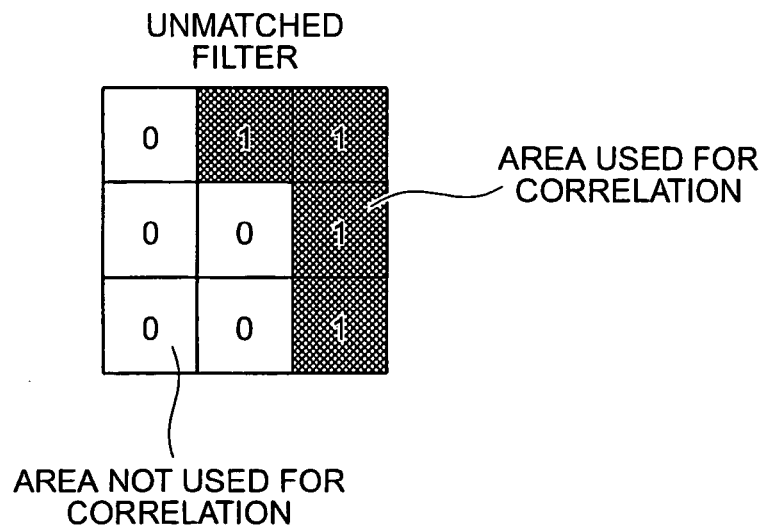
FIG. 21 is an illustration explaining computation of correlation in repeated searching.

In the unmatched filter UF1(ite) as illustrated in FIG. 21, correlation computation is not performed at pixels having the value "0" whereas performed at pixels having the value "1".

A difference is obtained between pixels at the same location in the first small block and a second small block determined by the first motion vector MV1(ite).

Determined according to differences between pixels in the first and second small blocks are matched pixels for which the difference is equal to or smaller than a reference value, and unmatched pixels for which the difference is larger than the reference value.

The values "0" and "1" (integer) are given at the matched pixels and unmatched pixels, respectively, in a first unmatched filter UF1 (ite−1) having the same size as the first small block.

A current iterative unmatched filter UF1 (ite) and one prior iterative unmatched filter UF1 (ite−1) are ANDed. The ANDed result is defined as the current iterative unmatched filter UF1 (ite) in steps S118 and S119.

These steps achieve smooth division of blocks having similar correlation.

a4) The steps s112 to sl19 are recursively performed for the variable ite up to a specific repetition number "n" (steps S120 and s121).

Figure 22:
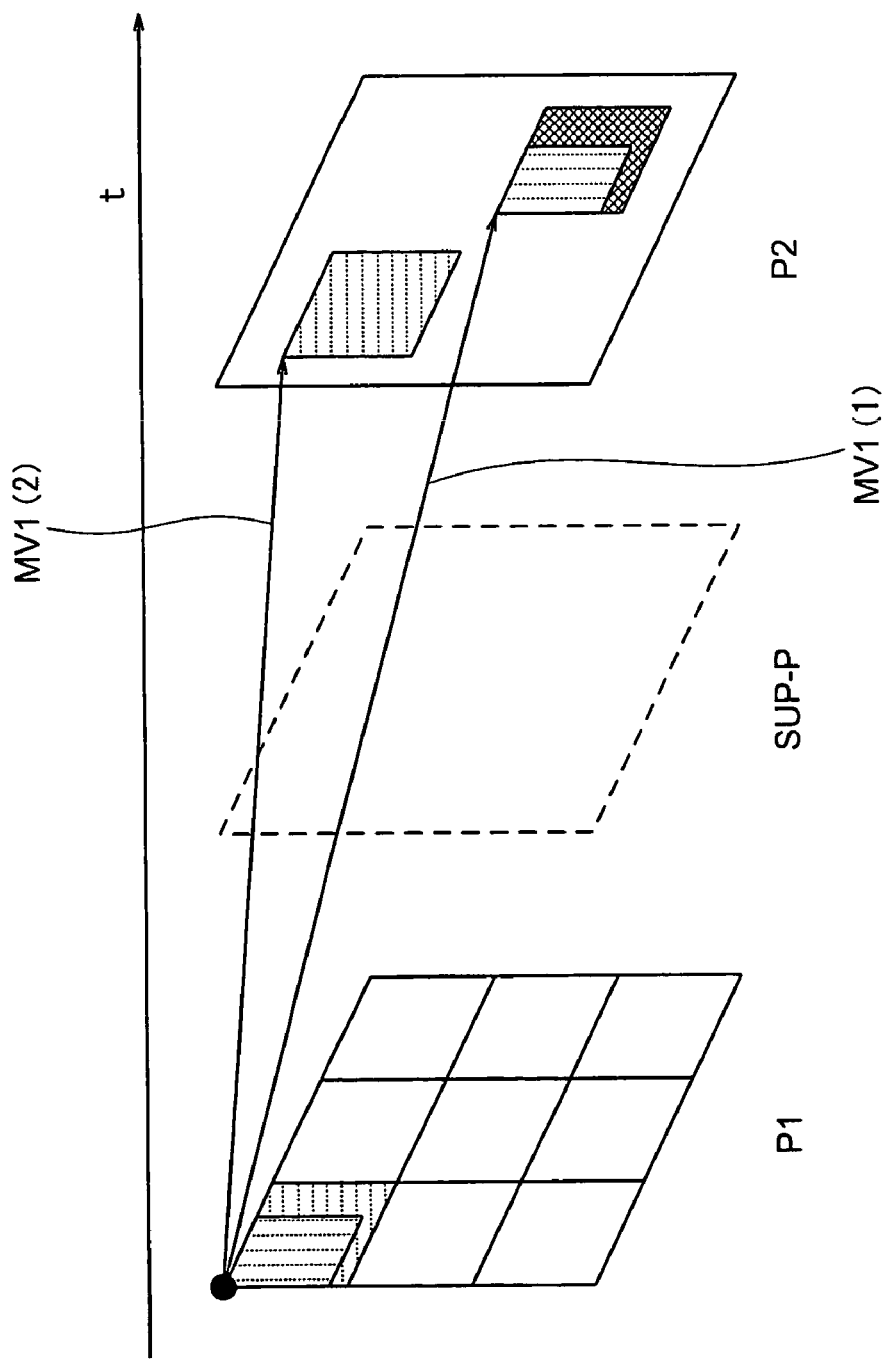
FIG. 22 is an illustration explaining a motion-vector estimation procedure in the second embodiment.

The recursive procedure obtains a first motion-vector group mvg1 of first motion vectors MV1 (ite) (ite=1, . . . , n) and a first unmatched-filter group filter1 of first unmatched filters UF1 (ite) (ite=1, . . . , n), as illustrated in FIG. 22.

The motion estimation employed in this embodiment is forward motion estimation for estimating a motion vector to the posterior second reference frame p2 from the anterior first reference frame p1.

An alternative to the forward motion estimation in this embodiment is, for example, backward motion estimation for estimating a motion vector to the anterior first reference frame p1 from the posterior second reference frame p2.

Another alternative is, for example, by-directional motion estimation in which a higher reliable result of either the forward or the backward motion estimation is selected.

b) Vector-Scale Conversion Procedure

Referring back to FIG. 14, a vector-scale conversion procedure is performed by the vector-scale converter 16a shown in FIG. 12 (step S63). The length of the first motion-vector group mvg1 is scaled down to ½ to obtain a second motion-vector group mvg2, to produce a support frame in the middle of a 60-Hz signal.

c) First Motion-Compensation Procedure

A first motion-compensation procedure is performed by the first motion compensator 18a shown in FIG. 12, based on the second motion-vector group, the first unmatched-filter group, the first reference frame, and the second reference frame (step S64 in FIG. 14).

Figure 19:
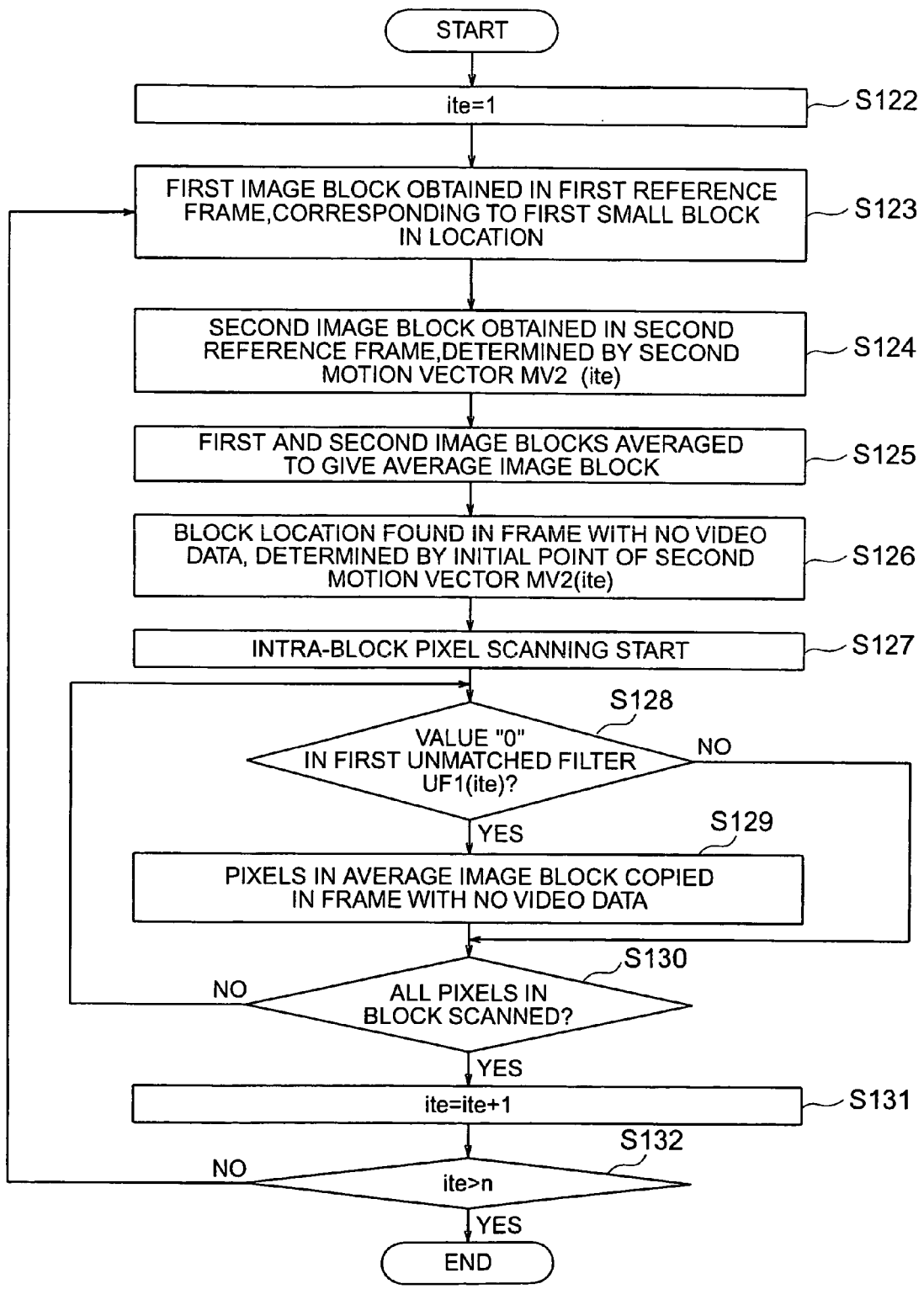
FIG. 19 is a flow chart showing a first motion compensation procedure in the second embodiment.

The first motion-compensation procedure is performed is accordance with a flow chart shown in FIG. 19.

The value "1" is substituted for the variable ite (step S122). Obtained next is a first image block, in the first reference frame p1, corresponding to the first small block in location (S123). Also obtained is a second image block in the second reference frame p2, determined by the terminal of the second motion vector MV2 (ite).

The first and second image blocks are averaged to obtain an average image block (step S125). The location for a block is found in a frame with no video data, determined by the initial point of the second motion vector MV2(ite) (step S126). The frame with no video data is converted into a frame to be interpolated through procedures described below.

Pixel scanning starts in the average image block (step S127), to copy pixels in the average image block into a small block in the frame with no video data.

Figure 23:
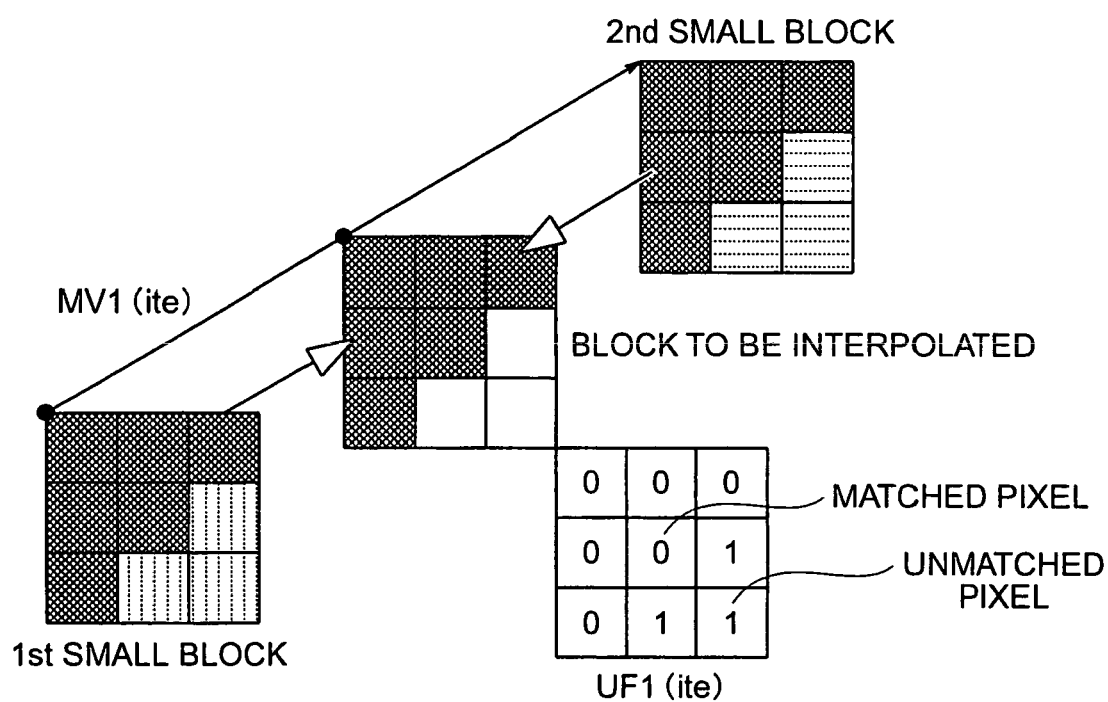
FIG. 23 is an illustration explaining a first motion compensation procedure in the second embodiment.

Pixels to be copied are, as illustrated in FIG. 23, those having the value "0" only in the first unmatched filter UF1(ite) in steps S128, S129, and S130.

The above procedure is repeated for the variable ite from "1" to "n" in steps S131 and S132.

Figure 24:
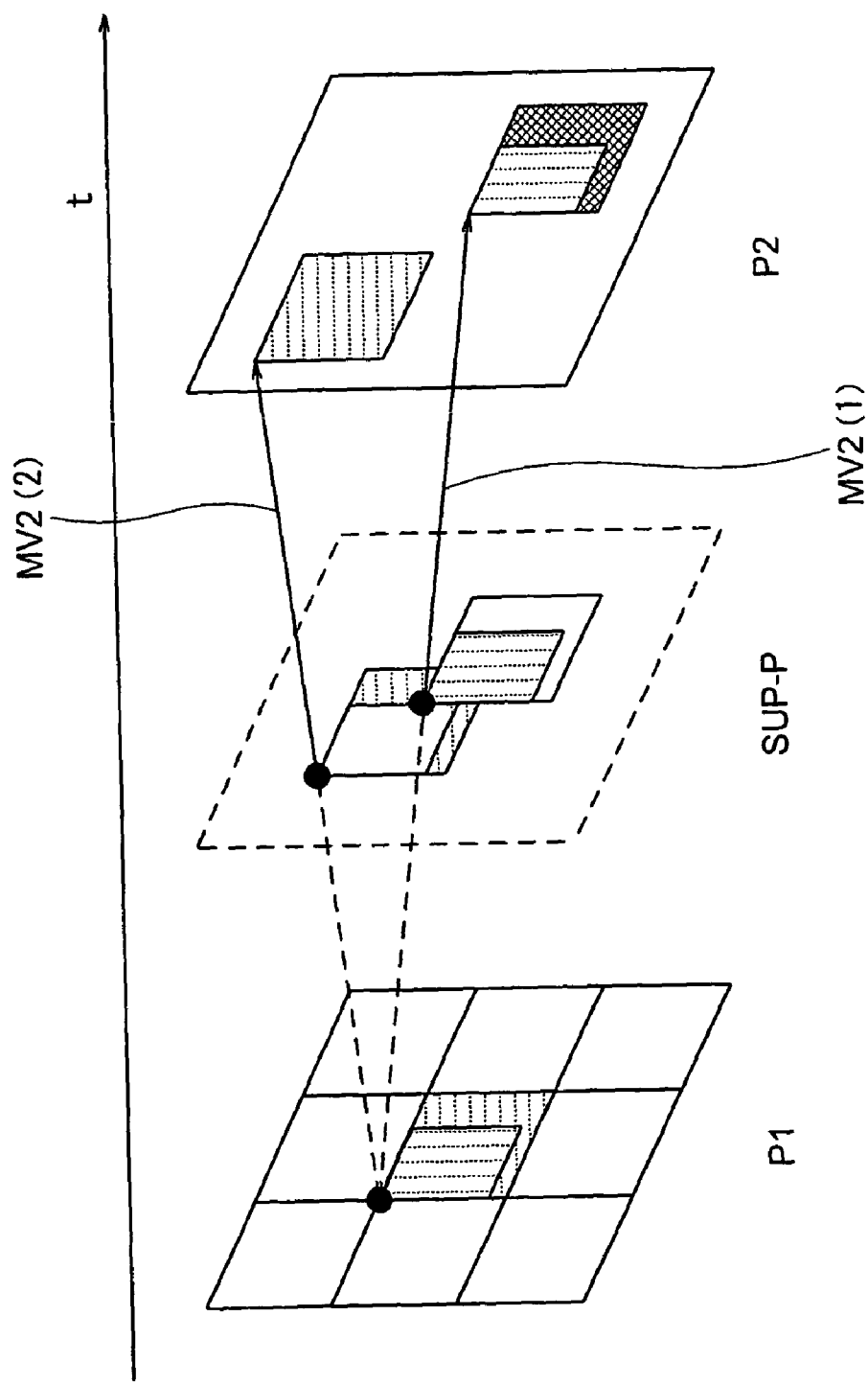
FIG. 24 is an illustration explaining a support-frame production procedure in the second embodiment.
Figure 25:
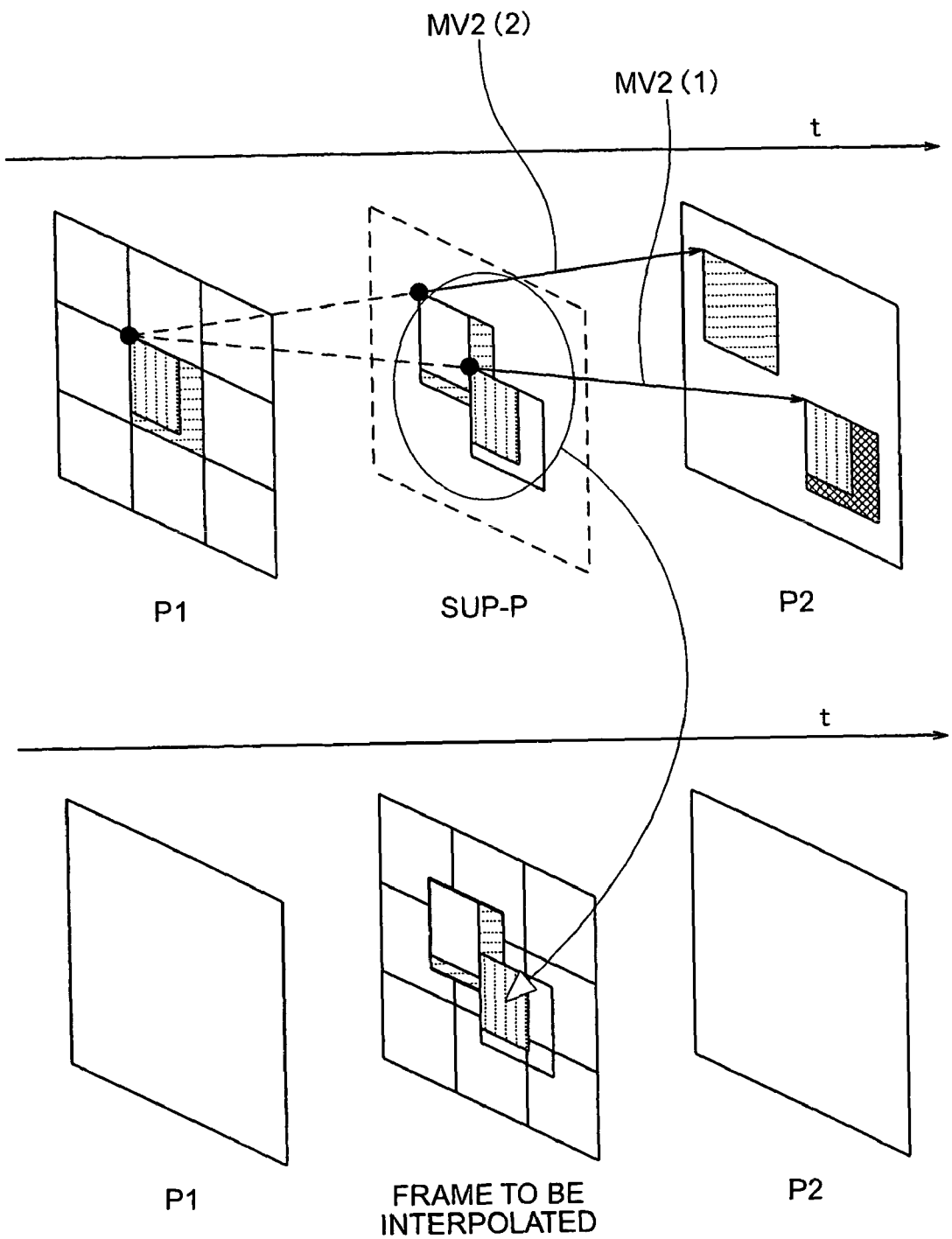
FIG. 25 is an illustration explaining use of a support frame in the second embodiment.

The procedures a) to c) are performed for all of the small blocks divided in the procedure a), to produce the support frame sup-p, as illustrated in FIG. 24.

d) Pixel Area Detection Procedure

A pixel area detection procedure is performed by the pixel area detector 20a shown in FIG. 12.

This procedure is to detect pixels used in the support frame to obtain a pixel filter filter4 in step S51 shown in FIG. 13. The pixel filter can be obtained in accordance with the flow chart shown in FIG. 4, like the first embodiment. The value "0" is given to each pixel stored no pixel values whereas the value "1" to each of other pixels, to obtain the pixel filter.

e) Motion-Vector Candidate Estimation and Examination Procedure

A motion-vector candidate estimation is performed by the motion-vector candidate estimator 22a (FIG. 12) and a motion-vector candidate examination is performed by the motion-vector candidate examiner 24a (FIG. 12).

In the motion-vector candidate estimation, the frame with no video data is divided into small blocks of square grids (step S52 in FIG. 2).

Figure 15:
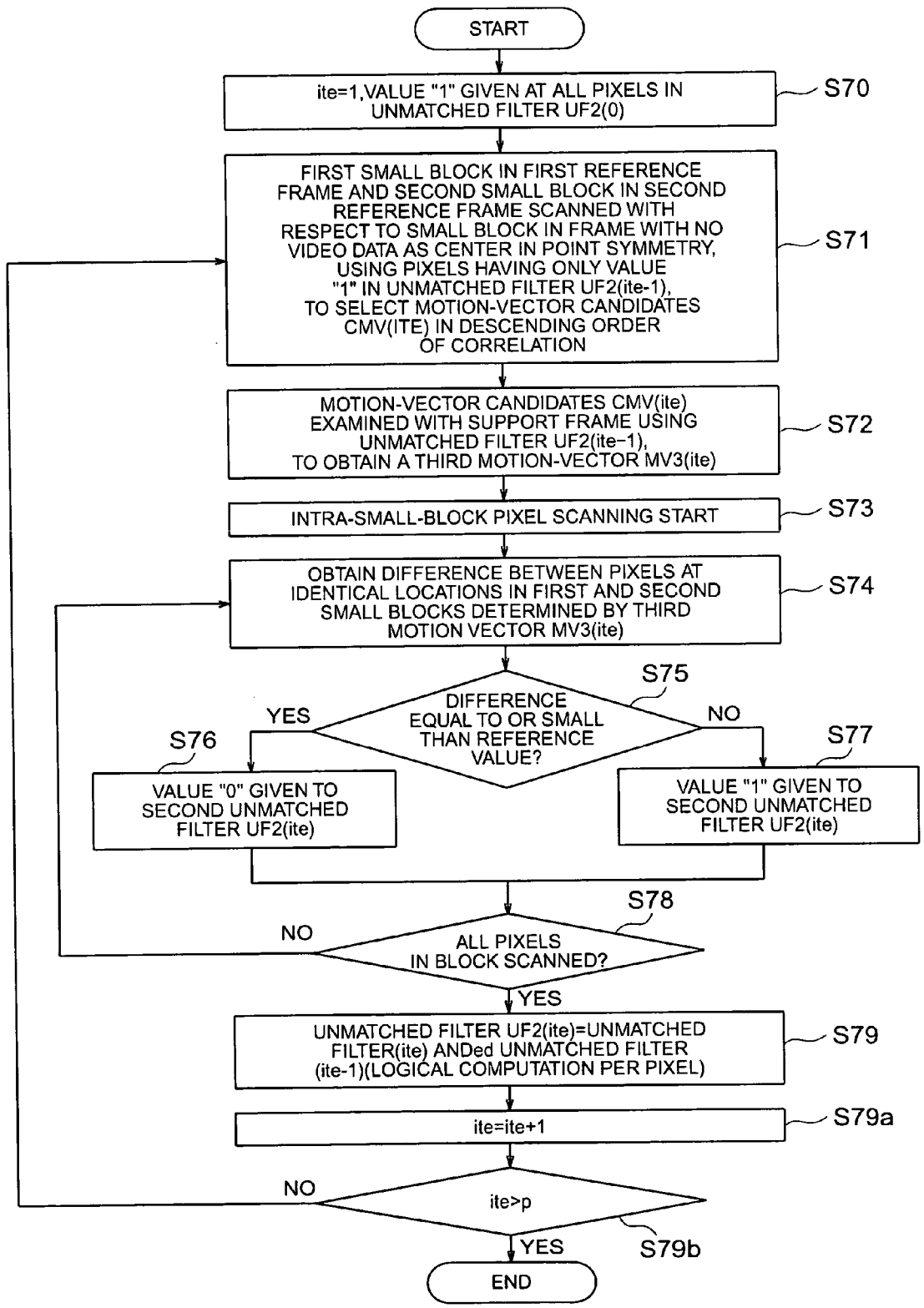
FIG. 15 is a flow chart showing a motion-vector candidate estimation and examination procedure in the second embodiment.

A recursive search is performed to select several motion-vector candidate groups candidate_g. The candidate groups are examined using the support frame, to obtain a third motion-vector group mv3 and a second unmatched-filter group filter2, as disclosed below with reference to FIG. 15.

e1) An initial setting is made in step S70 shown in FIG. 15, to substitute "1" for the variable ite and also for pixels in a second unmatched filter UF2(0).

Figure 16:
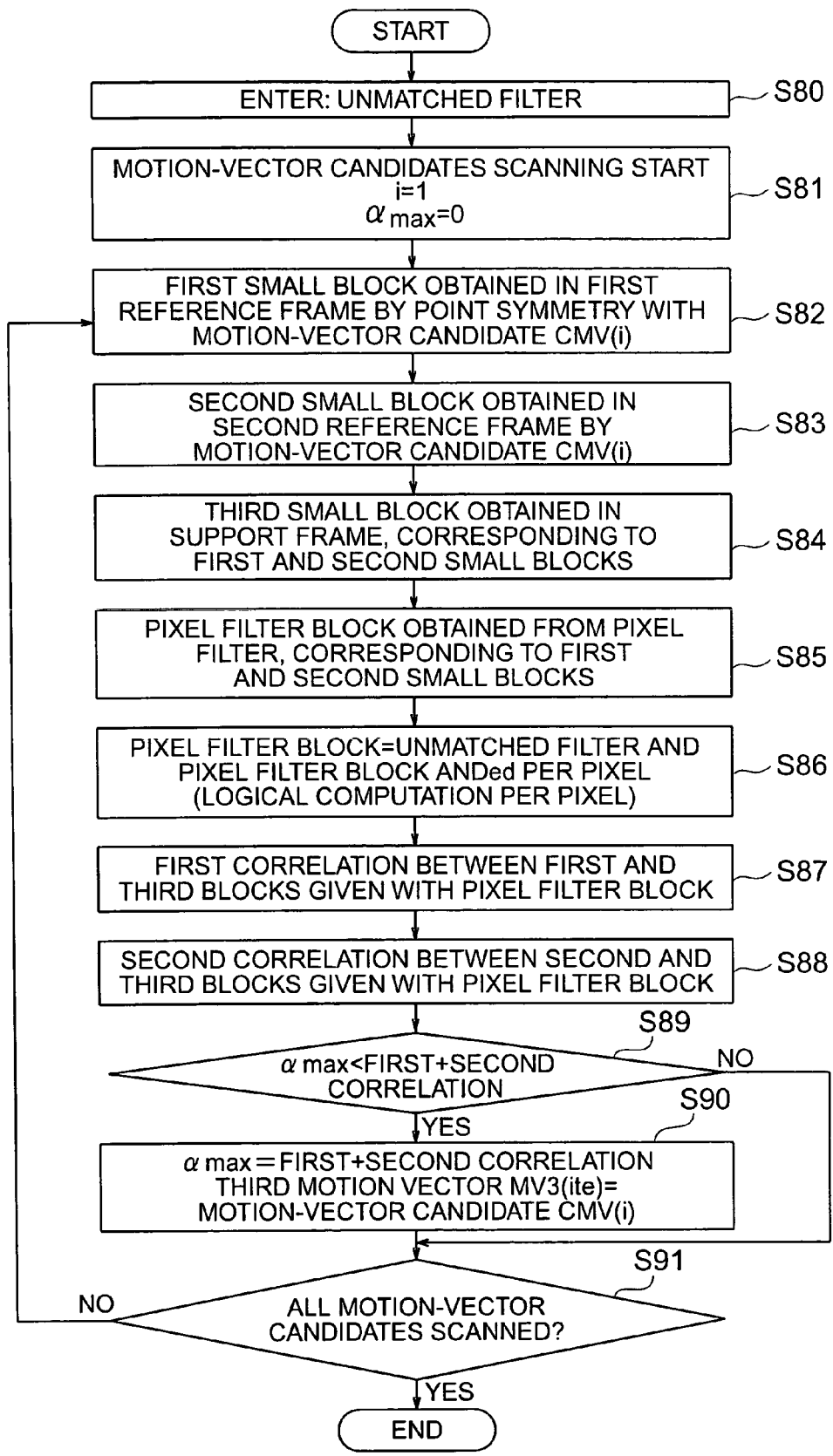
FIG. 16 is a flow chart showing a motion-vector candidate examination procedure in the second embodiment.
Figure 26A:
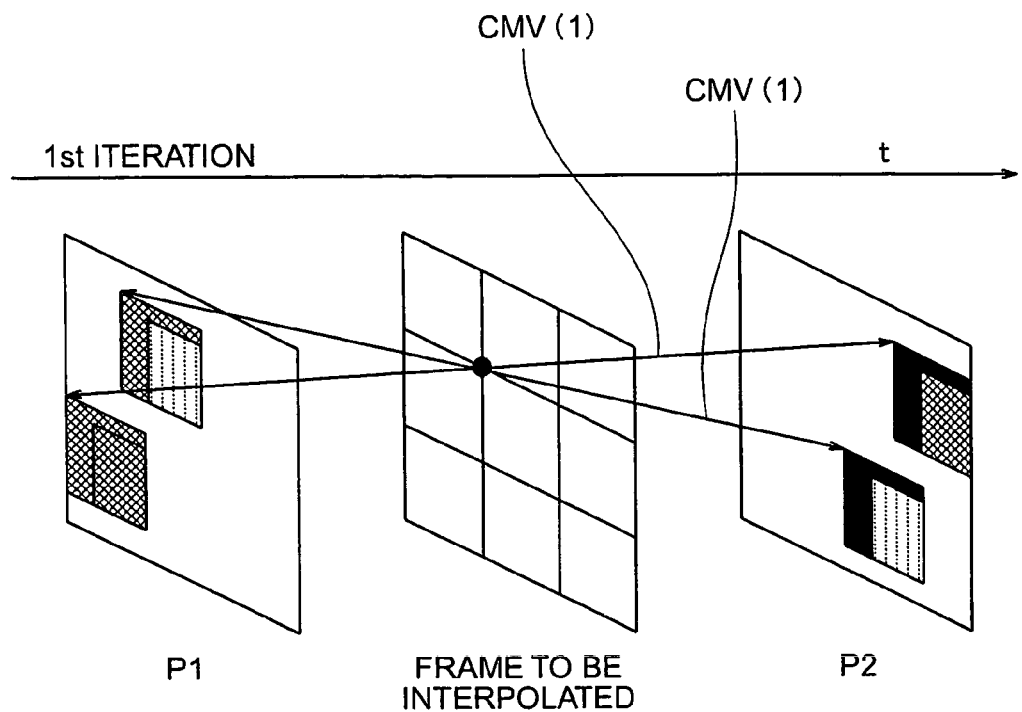
FIGS. 26A and 26B are illustrations explaining a motion-vector candidate estimation procedure in the second embodiment.
Figure 26B:
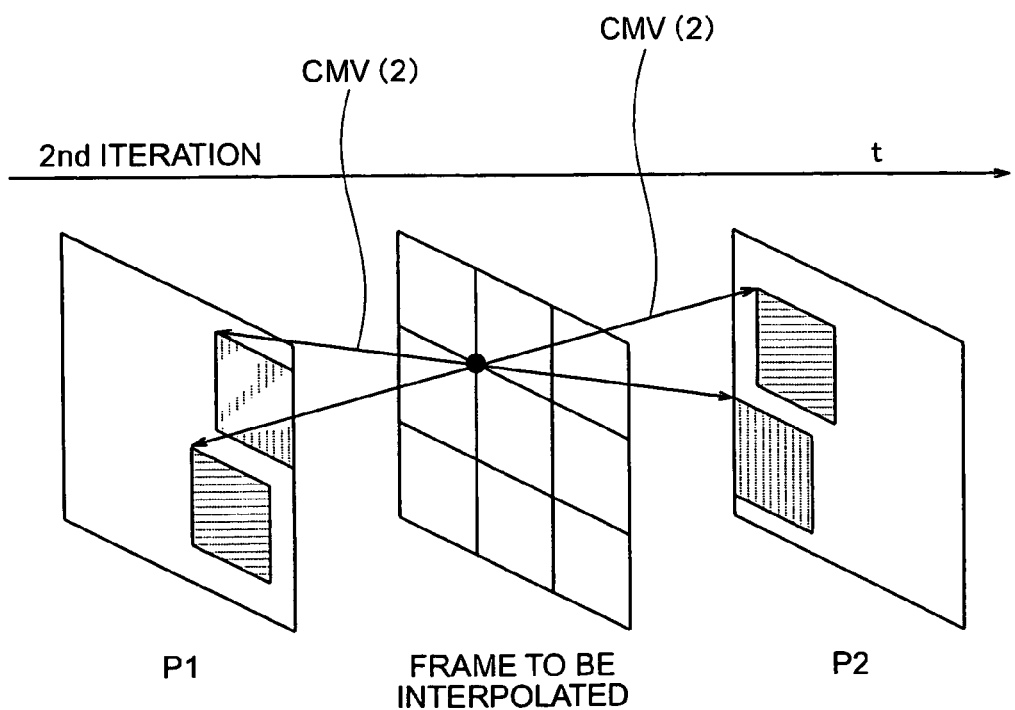

Next, in step S71, a first small block in the first reference frame and a second small block in the second reference frame are scanned with respect to a small block in the frame with no video data as the center in a point symmetrical relationship between the first and the second small block, using pixels having only the value "1" in a second unmatched filter UF2(ite−1), thus selecting several motion-vector candidates CMV(ite) in descending order of correlation, as illustrated in FIGS. 26A and 26B, according to sum of matched number of pixels, etc.

e2) The motion-vector candidates CMV(ite) are examined with the support frame using the second unmatched filter UF2(ite−1), to obtain a third motion-vector MV3(ite), in step S72 shown in FIG. 15, in accordance with a flow chart shown in FIG. 16.

An unmatched filter is entered first for initial settings in step S80. Motion-vector candidates scanning starts with substituting "1" and "0" for variables i and αmax, respectively, in step S81.

Obtained next in step S82 is a first small block, in the first reference frame, determined by point symmetry with a motion-vector candidate CMV(i).

A second small block is obtained in the second reference frame, determined by the motion-vector candidate CMV(i) in step S83.

Obtained further in step S84 is a third small block, in the support frame, corresponding to first and second blocks.

Obtained next in step S85 is a pixel filter block from a pixel filter, corresponding to the first and second blocks.

The unmatched filter and the pixel filter block are ANDed per pixel (step S86). The ANDed result is given as the pixel filter block which is then used for obtaining a first correlation between the first and the third block and also a second correlation between the second and the third block (steps S87 and 88). These correlations are obtained in accordance with the flow chart shown in FIG. 6, like the first embodiment.

The first and the second correlation are added to each other and it is determined whether the addition result is larger than $\alpha max$ (step S89). The procedure moves onto step S91 if not larger or equal (NO in step S89) whereas to step S90 if larger (YES in step S89).

The addition of the first and the second correlation is substituted for $\alpha max$ and a motion-vector candidate CMV(i) is given to the third motion vector MV3(ite) in step S90, then the procedure moves onto step S91.

It is determined in step S91 whether all motion-vector candidates have been scanned. If not (NO step S91), the procedure returns to step S82 to repeat the succeeding steps. In contrast, the motion-vector examination procedure ends if all candidates have been scanned (YES step S91).

e3) Referring back to FIG. 15, intra-small-block pixel scanning starts in step S73.

Obtained next in step S74 are differences between pixels at the identical locations in a first small block and a second small block determined by a third motion vector MV3(ite), as illustrated in FIG. 20.

The values "0" (integer) and "1" (integer) are given to a second unmatched filter UF2(ite) having the same size as the first small block at matched pixels and unmatched pixels, respectively, (steps S75, S76, and S77). The matched pixels have a difference therebetween equal to or smaller than a reference value. On the contrary, the unmatched pixels have a difference therebetween larger than the reference value.

e4) The procedure returns to the motion-vector candidate estimation to recursively scan a first small block in a frame and a second small block in another frame, the two frames being symmetrically located with a target small block at the symmetrical center.

In scanning, as illustrated in FIG. 21, correlation computation is performed not at pixels having the value "0" but at pixels having the value "1" in the second unmatched filter UF2(ite).

A current iterative unmatched filter and one prior iterative unmatched filter are ANDed. The ANDed result is defined as the current iterative unmatched filter (step S79).

This step achieves smooth division of blocks having similar correlation.

a5) The steps S71 to S79 are recursively performed up to a specific repetition number "k" (steps S79a and S79b).

The recursive procedure obtains a third motion-vector group mv3 of third motion vectors MV3 (ite) (ite=1, . . . , k) and a second unmatched-filter group filter2 of second unmatched filters UF2 (ite) (ite=1, . . . , k).

f) Second Motion-Compensation Procedure

Referring back to FIG. 13, a second motion-compensation procedure is performed by the second motion compensator 26a shown in FIG. 12.

Figure 17:
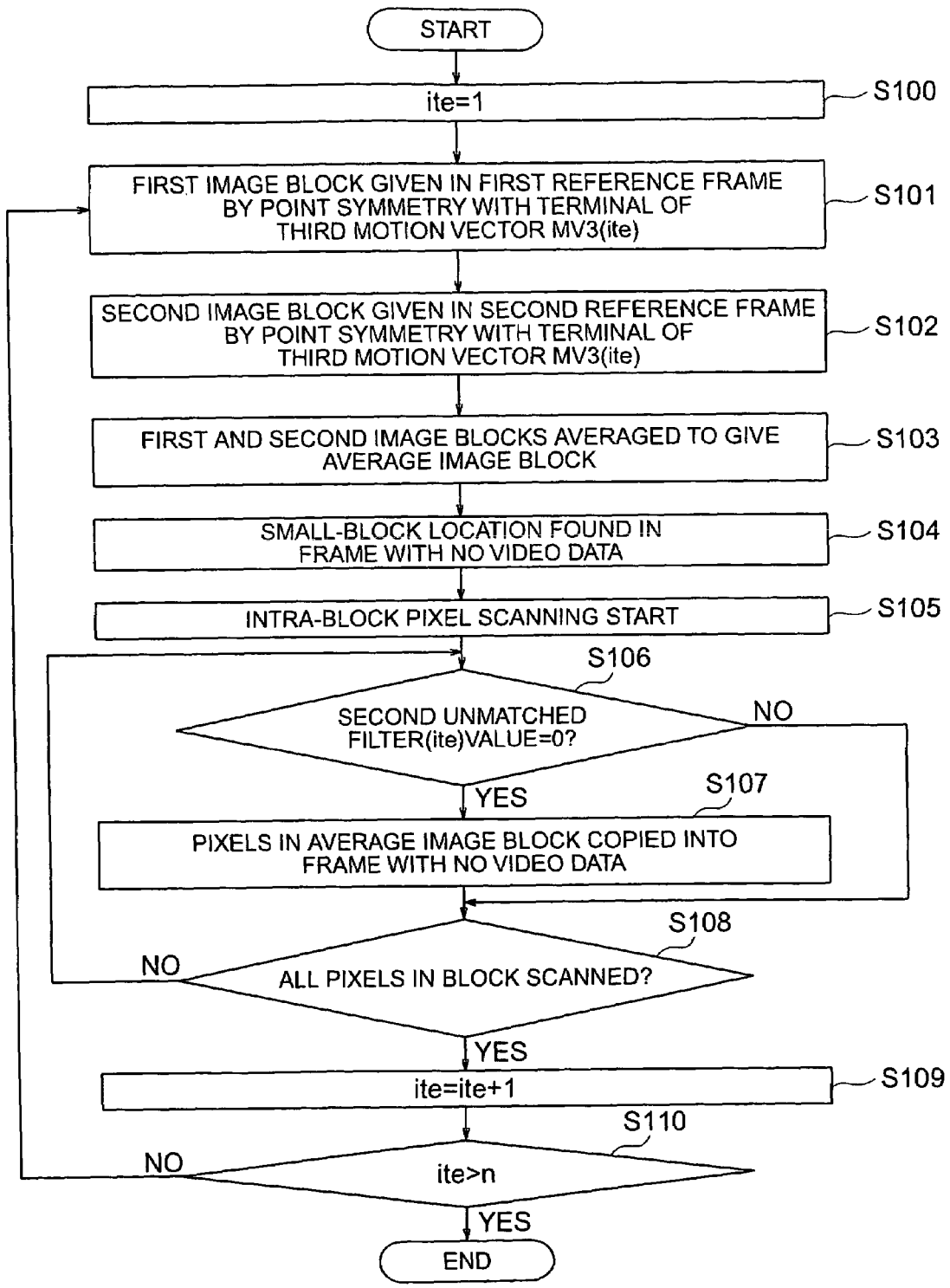
FIG. 17 is a flow chart showing a second motion compensation procedure in the second embodiment.

The second motion-compensation procedure is performed based on the third motion-vector group, the second unmatched filter group, and also the first and second reference frames in step S56, which will be disclosed with reference to FIG. 17.

An initial setting is made in step S100 shown in FIG. 17, to substitute "1" for the variable ite.

A first image block in the second reference frame and another first image block in the first reference frame are averaged to obtain an average image block (S101, S102 and S103).

The former first image block in the second reference frame is determined by the terminal of the third motion vector MV3(ite). The latter first image block in the first reference frame is determined by a position having a point symmetrical relation with the terminal of the third motion vector MV3(ite).

Figure 28:
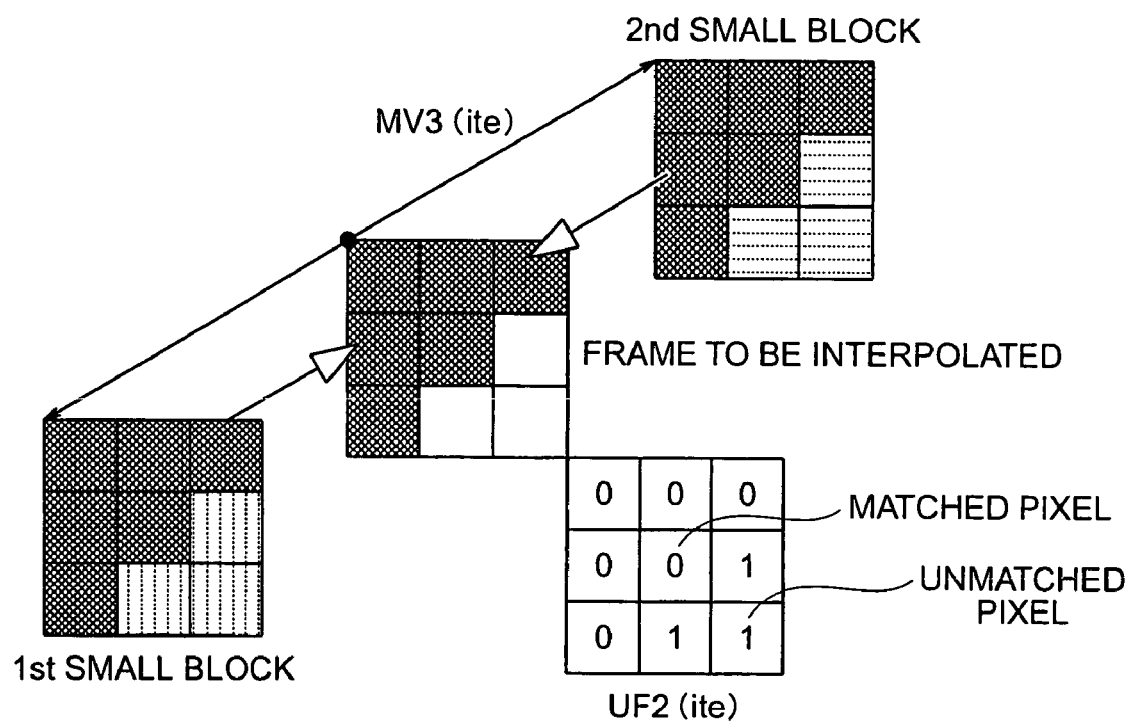
FIG. 28 is an illustration explaining a second motion compensation procedure in the second embodiment.

The average image block is then copied into a small block in the frame with no video data. Pixels to be copied are, as illustrated in FIG. 28, those having only the value "0" in the second unmatched filter UF2(ite) in steps S104, S105, S106, and S107.

The above procedure is repeated until all pixels in the block are scanned (step S108). The vale "1" is then added to the variable ite and the above procedure is repeated until the variable reaches "n" that is the number of small blocks of square grids to which the frame with no video data has been divided.

Therefore, like the first embodiment, the second embodiment is advantageous in producing high-quality frames with no video data, freeing from a gap or superimposition, and also from a background displayed on an image area on which the object should be displayed.

(Third Embodiment)

Figure 29:
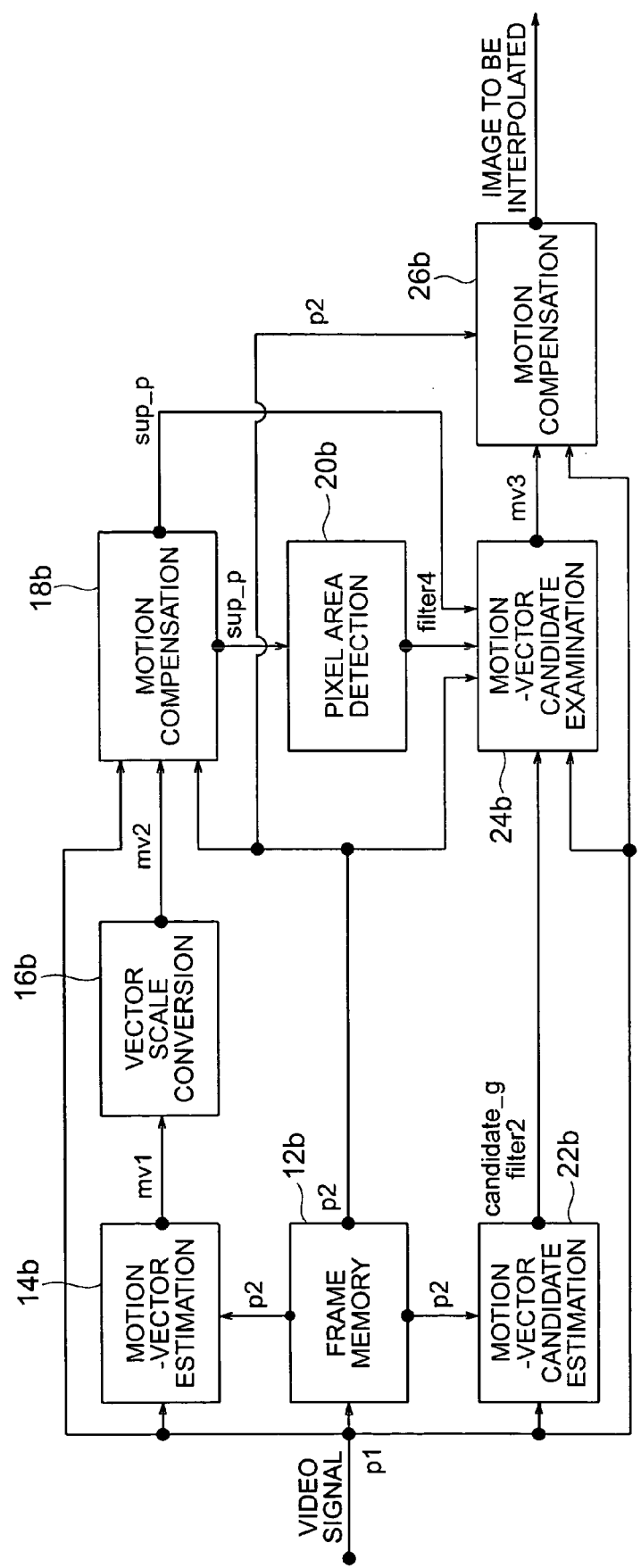
FIG. 29 is a block diagram of a frame interpolation apparatus used in a third embodiment of a frame interpolation method according to the present invention.
Figure 30:
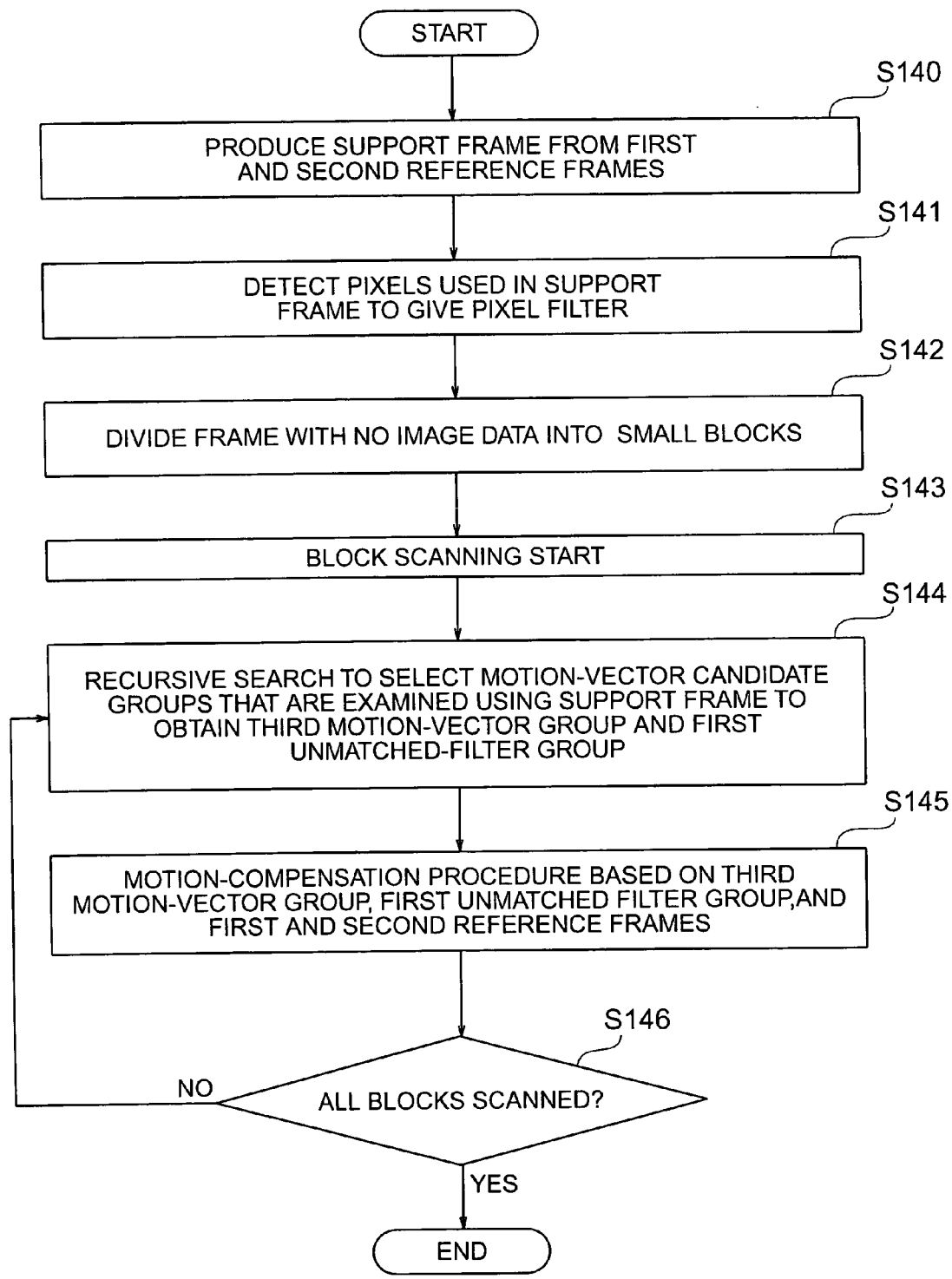
FIG. 30 is a flow chart showing an overall frame interpolation procedure in the third embodiment of the frame interpolation method.

A method of frame interpolation, a third embodiment of the present invention, will be disclosed with reference to FIGS. 29 and 30.

The third embodiment of frame interpolation method is a combination of the methods in the first and the second embodiment.

Shown in FIG. 29 is a frame interpolation apparatus that executes the third embodiment of frame interpolation.

The frame interpolation apparatus shown in FIG. 29 is equipped with a frame memory 12b, a motion-vector estimator 14b, a motion-scale converter 16b, a motion compensator 18b, a pixel area detector 20b, a motion-vector candidate estimator 22b, a motion-vector candidate examiner 24b, and another motion compensator 26b.

The third embodiment of frame interpolation will be disclosed in up-converting a 60-Hz non-interlaced video signal into a 120-Hz non-interlaced video signal, although this invention is not limited to this application.

Reference signs p1 and p2 shown in FIG. 29 indicate a first reference frame and a second reference frame, respectively, of an input video signal. The first reference frame p1 is an anterior frame and the second reference p2 is a posterior frame, respectively. Interposed between these frames is a frame to be interpolated.

The first reference frame p1 is supplied to the frame memory 12b, the motion-vector estimator 14b, the motion compensator 18b, the motion-vector candidate estimator 22b, the motion-vector candidate examiner 24b, and also the motion compensator 26b.

The second reference p2 is produced and stored at the frame memory 12b, based on the input video signal, and supplied to the motion-vector estimator 14b and the motion-vector candidate estimator 22b.

Shown in FIG. 30 is an overall frame interpolation procedure.

Produced first in step S140 is a support frame sup p from the first and second reference frames p1 and p2. The support frame production is performed by the motion-vector estimator 14b, the motion-scale converter 16b, and the motion compensator 18b shown in FIG. 1, according to the flow chart shown in FIG. 3, like the first embodiment.

a) Motion Estimation Procedure

A motion estimation procedure is performed by the motion-vector estimator 14b shown in FIG. 29.

As illustrated in FIG. 7, the first reference frame p1 is divided into small blocks of square grids, and then block are searched for in the second reference frame p2, having the highest correlation with the small blocks, thus estimating a first motion vector mv1 (steps S10, S11 and S12 in FIG. 3).

These steps may be executed in accordance with an algorism of block matching with SAD (Sum of Absolute Difference) for correlation.

The motion estimation employed in this embodiment is forward motion estimation for estimating a motion vector to the posterior second reference frame p2 from the anterior first reference frame p1.

An alternative to the forward motion estimation in this embodiment is, for example, backward motion estimation for estimating a motion vector to the anterior first reference frame p1 from the posterior second reference frame p2.

Another alternative is, for example, bi-directional motion estimation in which a higher reliable result of either the forward or the backward motion estimation is selected.

b) Vector-Scale Conversion Procedure

A vector-scale conversion procedure is performed by the vector-scale converter 16b shown in FIG. 29. The length of the first motion vector mv1 is scaled down to ½ to obtain a second motion vector mv2, to generate a support frame in the middle of a 60-Hz signal (step S13 in FIG. 3).

c) First Motion-Compensation Procedure

A first motion-compensation procedure is performed by the first motion compensator 18b shown in FIG. 29, like the first embodiment.

As illustrated in FIG. 8, in the first motion-compensation procedure, a first small block image in the first reference frame p1 and a second small block image in the second reference frame p2 are averaged to obtain an average image. The second small block is determined by the terminal of the second motion vector mv2. The average image block is then copied on a small block in the support frame sup-p (step S14 in FIG. 3). The small block is determined by the initial point of the second motion vector mv2.

The procedures a) to c) are performed for all of the first small blocks divided in the procedure a) in step S15 in FIG. 3, to produce the support frame sup-p, as illustrated in FIG. 7.

d) Pixel Area Detection Procedure

A pixel area detection procedure is performed by the pixel area detector 20b shown in FIG. 29, like the first embodiment.

Detected are pixels carrying no pixel values in the support frame. The value "0" is given to each of these pixels stored no pixel values whereas the value "1" to each of the other pixels, to output a pixel filter having these pixels.

e) Motion-Vector Candidate Estimation Procedure

A motion-vector candidate estimation procedure is performed by the motion-vector candidate estimator 22b shown in FIG. 29, like the second embodiment.

e1) A frame with no video data is divided into small blocks of square grids. The frame with no video data is converted into a frame to be interpolated through procedures described below. Correlation is computed between a first small block in the first reference frame and a second small block in the second frame, the first and the second small block being symmetrically located with small blocks in the frame with no video data at the symmetrical center. Sum of matched number of pixels can be used for correlation. Several vectors are then selected as motion-vector candidates CMV(ite) in descending order of correlation, as illustrated in FIGS. 26A and 26B.

e2) Motion-Vector Candidate Examination Procedure

A motion-vector candidate examination procedure is performed by the motion-vector candidate examiner 24b shown in FIG. 29, like the second embodiment, to decide a motion vector among the motion-vector candidates CMV(ite) (ite=1, . . . , k), using the support frame sup-p as reference information.

Obtained next are a first small block in the first reference frame p1 and a second small block in the second reference frame p2, each determined from one of the selected motion-vector candidates CMV(ite). Also obtained is a third small block in the support frame sup-p corresponding to the first and second small blocks.

A first correlation between the first and the third block and also a second correlation between the second and the third block are added to each other. The added result is given to the one of the selected motion-vector candidates CMV(ite).

Figure 27:
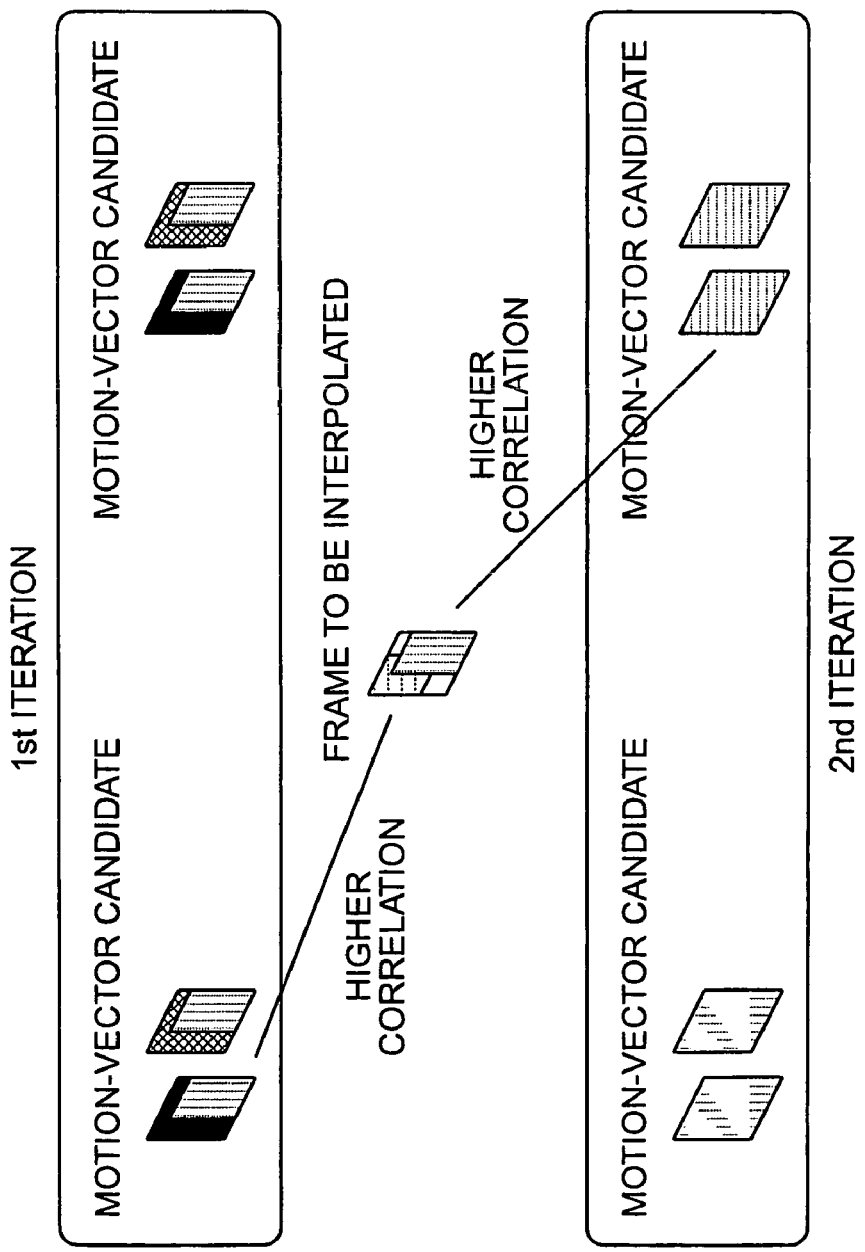
FIG. 27 is an illustration explaining a motion-vector candidate examination procedure in the second embodiment.

The procedure is executed for all motion-vector candidates in the small block in the frame with no video data, thus one candidates having the highest correlation being output as a third motion vector3(ite), as shown in FIG. 27.

Obtained next are matched pixels and unmatched pixels between a first small block and a second small block determined by the third motion vector3(ite). The values "0" (integer) and "1" (integer) are given to a second unmatched filter UF2(ite) having the same size as the first small block at the matched pixels and the unmatched pixels, respectively.

e4) The procedure returns to the motion-vector candidate estimation to recursively scan a first small block in a frame and a second small block in another frame, the two frames being symmetrically located with a target small block at the symmetrical center.

In scanning, correlation computation is performed not at pixels having the value "0" but at pixels having the value "1" in the second unmatched filter UF2(ite).

A current iterative unmatched filter and one prior iterative unmatched filter are ANDed. The ANDed result is defined as the current iterative unmatched filter.

This step achieves smooth division of blocks having similar correlation.

e5) The above procedure is recursively performed up to a specific repetition number "k" to obtain a motion-vector group of motion vectors CMV (ite) (ite=1, . . . , k) and a second unmatched-filter group filter2 of second unmatched filters UF2 (ite) (ite=1, . . . , k), as illustrated in FIGS. 26A and 26B.

f) Second Motion-Compensation Procedure

A second motion-compensation procedure is performed by the second motion compensator 26b shown in FIG. 29.

An image block in the second reference frame and another image block image in the first reference frame are averaged to obtain an average image block.

The former first small block in the second reference frame is determined by the terminal of the third motion vector MV3(ite). The latter first small block in the first reference frame is determined by a position having a point symmetrical relation with the terminal of the third motion vector MV3(ite).

The average image block is then copied into a target small block in the frame with no video data. Pixels to be copied are, as illustrated in FIG. 28, those having only the value "0" in the second unmatched filter UF2(ite).

The above procedure is repeated until for all small blocks of square grids to which the frame to be interpolated has been divided.

As disclosed, the third embodiment first obtains a support frame and then an interpolated frame, thus, like the first embodiment, being advantageous in producing high-quality interpolated frames, freeing from a gap or superimposition, and also from a background displayed on an image area on which the object should be displayed.

Fourth Embodiment

Figure 31:
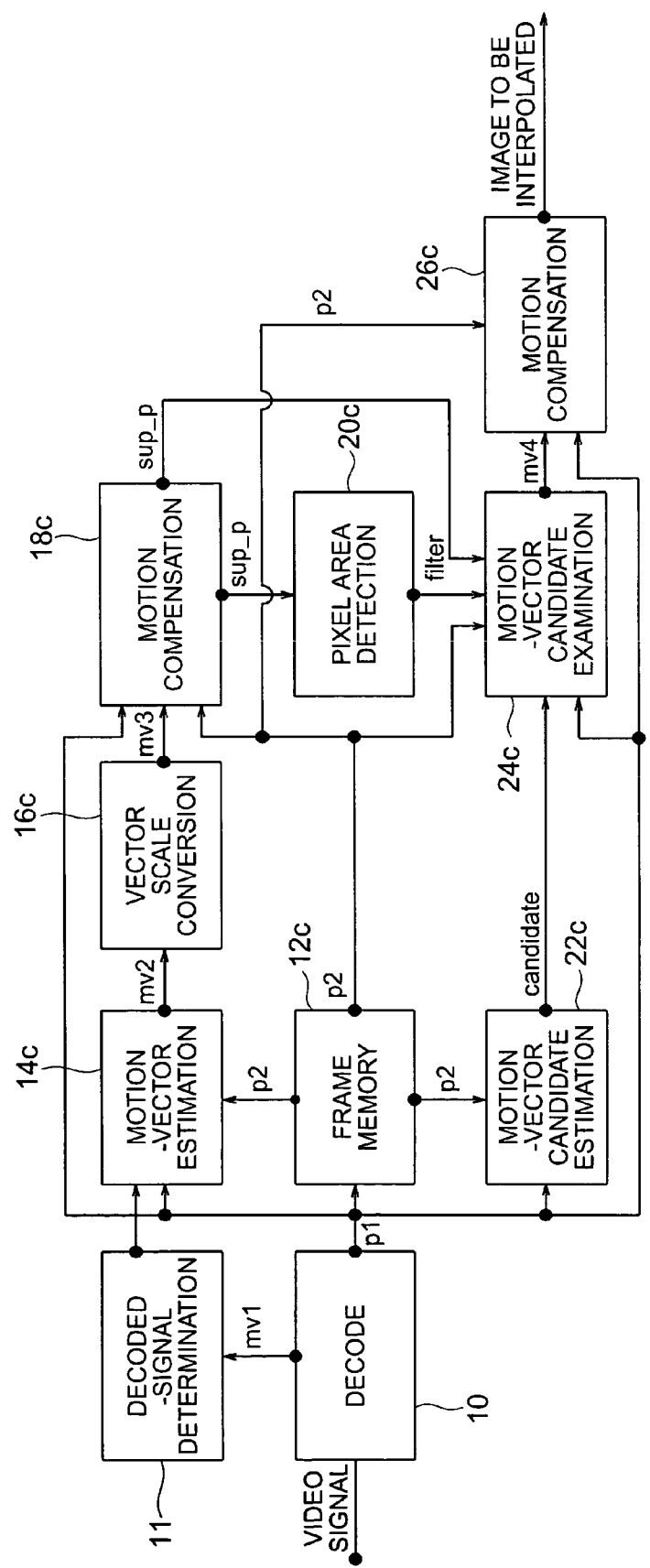
FIG. 31 is a block diagram of a frame interpolation apparatus used in a fourth embodiment of a frame interpolation method according to the present invention.
Figure 33:
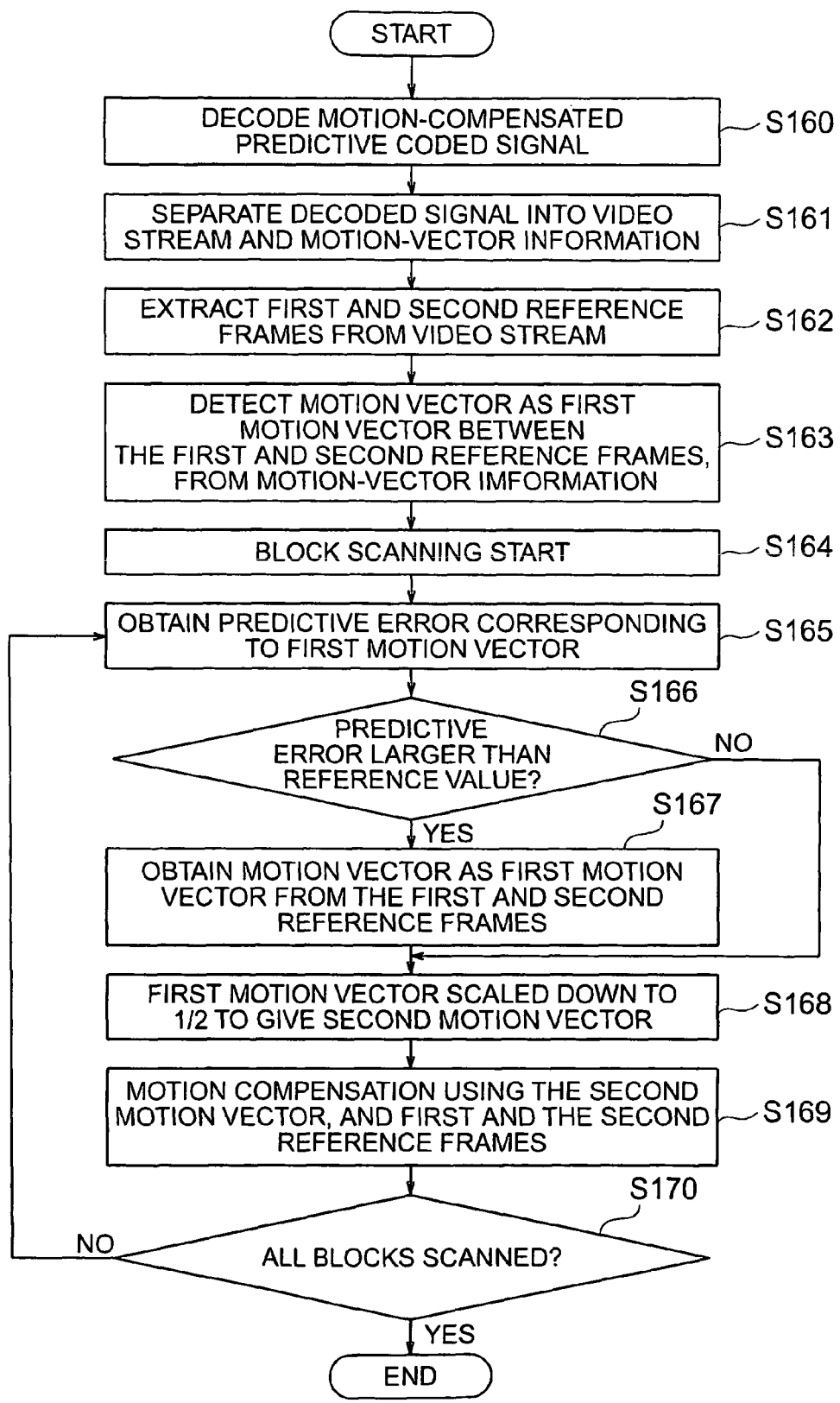
FIG. 33 is a flow chart showing a support-frame production procedure in the fourth embodiment.

A method of frame interpolation, a fourth embodiment of the present invention, will be disclosed with reference to FIGS. 31 and 33.

The fourth embodiment of frame interpolation method uses MPEG data.

Shown in FIG. 31 is a frame interpolation apparatus that executes the fourth embodiment of frame interpolation.

The frame interpolation apparatus shown in FIG. 31 is equipped with a decoder 10, a decoded-signal determiner 11, a frame memory 12c, a motion-vector estimator 14c, a motion-scale converter 16c, a motion compensator 18c, a pixel area detector 20c, a motion-vector candidate estimator 22c, a motion-vector candidate examiner 24c, and another motion compensator 26c.

The fourth embodiment of frame interpolation will be disclosed in up-converting a 60-Hz non-interlaced video signal into a 120-Hz non-interlaced video signal, although this invention is not limited to this application.

Reference signs p1 and p2 shown in FIG. 31 indicate a first reference frame and a second reference frame, respectively, of an input video signal. The first reference frame p1 is an anterior frame and the second reference p2 is a posterior frame, respectively. Interposed between these frames is a frame to be interpolated.

The first reference frame p1 is supplied to the frame memory 12c, the motion-vector estimator 14c, the motion compensator 18c, the motion-vector candidate estimator 22c, the motion-vector candidate examiner 24c, and also the motion compensator 26c.

The second reference p2 is produced and stored at the frame memory 12c, based on the input video signal, and supplied to the motion-vector estimator 14c and the motion-vector candidate estimator 22c.

a) A motion-compensated predictive coded signal is decoded by the decoder 10. A video stream and motion-vector information are separated from the decoded signal. A first and a second reference frame are extracted from the video stream, for giving a first motion vector mv1 between the reference frames.

b) A predictive error corresponding to the first motion vector is examined by the decoded-signal determiner 11. It is determined that the first motion vector has low reliability if the predictive error is larger than a reference value.

c) Only the blocks determined as having low reliability are subjected to motion-vector estimation from the first and second reference frames by the motion-vector estimator 14c, thus a second motion vector mv2 being obtained. In contrast, the first motion vector is output as a second motion vector for the blocks not determined as having low reliability.

d) The length of the second motion vector mv2 is scaled down to ½ by the vector-scale converter 16c to obtain a third motion vector, thus a support frame being generated in the middle of a 60-Hz signal.

e) A first motion-compensation procedure is performed by the first motion compensator 18c. An image block, in the second reference frame, determined by the terminal of the third motion vector and an image of a target block to which the third motion vector belongs are averaged to obtain an average image block. The average image block is then copied on a small block in a support frame, determined by the initial point of the third motion vector.

The procedures b) to d) are performed for all of the small blocks to produce a support frame, as illustrated in FIGS. 7 and 10.

f) Detected in the support frame by the pixel area detector 20c are pixels stored no pixel values. A pixel filter is output as having the value "0" given to each of these pixels stored no pixel values and the value "1" to each of the other pixels.

g) A frame with no video data is divided into small blocks of square grids by the motion-vector candidate estimator 22c. The frame with no video data in converted into a frame to be interpolated through procedures described below. Calculated from the first and second reference frames p1 and p2 is correlation between small blocks geometrically symmetrical with each other in theses reference frames, with the small blocks of the frame with no video data interposed therebetween, as the center of symmetry. Several vectors are then selected as motion-vector candidates in descending order of correlation.

h) A motion vector is determined by the motion-vector candidate examiner 24c among the motion-vector candidates using the support frame sup-p as reference information.

Obtained next are a first small block in the first reference frame p1 and a second small block in the second reference frame p2, each determined from one of the motion-vector candidates. Also obtained is a third small block in the support frame sup-p corresponding to the first and second small blocks.

Obtained next are a first correlation between the first and the third block and also a second correlation between the second and the third block. The first and second correlations are added to each other. The added result is given as correlation of the motion-vector candidate.

The above procedure is performed for all of the motion-vector candidates belonging to a target small block in the frame with no video data to obtain correlations. A motion-vector candidate having the highest correlation is output as the third motion vector, as illustrated in FIG. 11.

The computation to obtain the first and second correlations could have a problem of extremely low correlation on pixels stored no pixel values in the support frame sup-p.

This problem is solved by using the pixel filter obtained by the pixel area detector 20c. Correlation computation is performed not for pixels having the value "0" but for pixels having the value "1" in the pixel filter.

i) A second motion-compensation procedure is performed by the second motion compensator 26c. An image block in the second reference frame p2 and another image block in the first reference frame p1 are averaged to obtain an average image block. The former image block is determined by the terminal of the third motion vector. The latter image block is determined by the location of a point that has a point symmetrical relationship with the terminal of the third motion vector. The average image block is copied on a target small block on the frame with no video data.

The procedure is repeated for all small blocks of squire grids in the frame with no video data to produce a frame to be interpolated.

Figure 32:
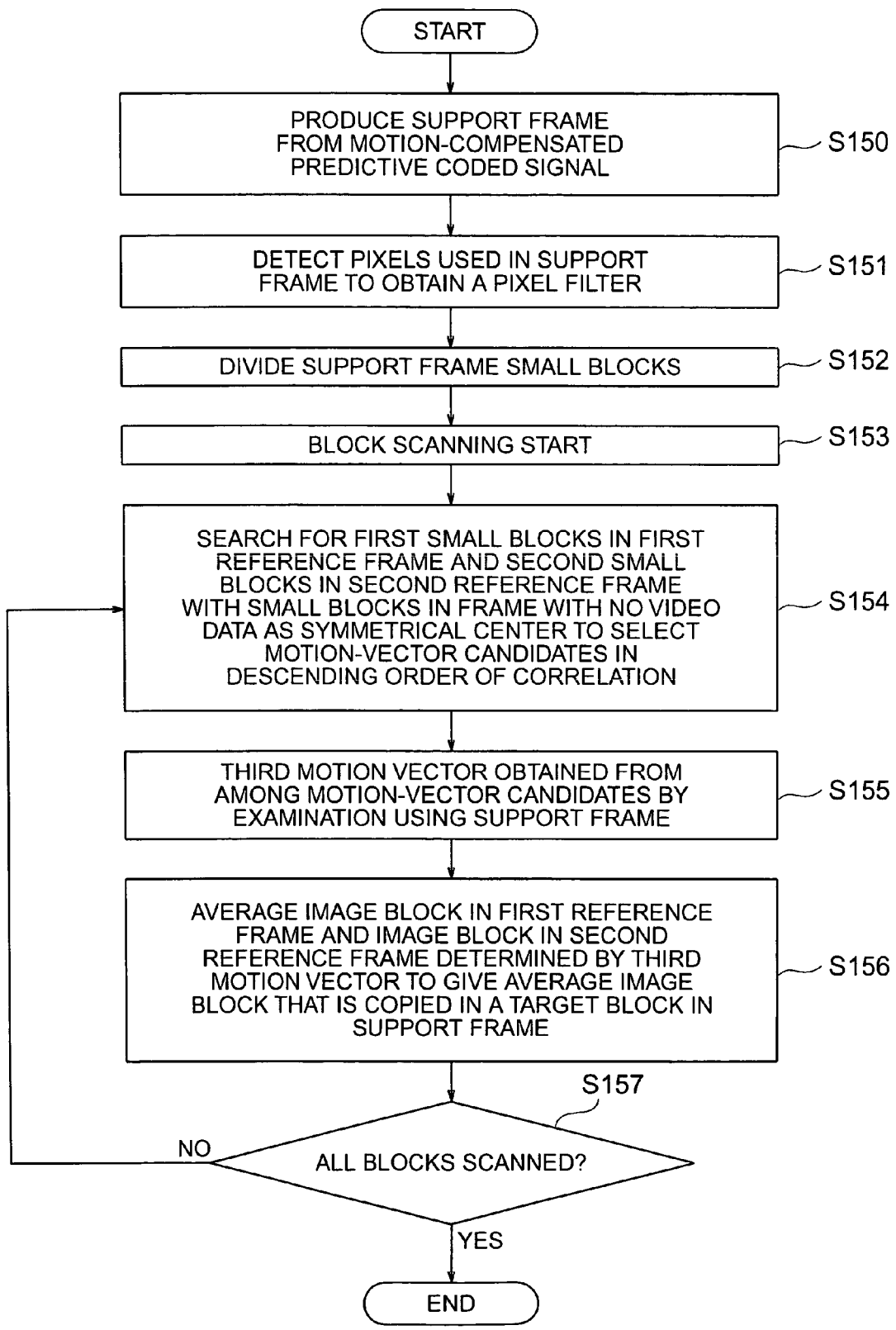
FIG. 32 is a flow chart showing an overall frame interpolation procedure in the fourth embodiment.

A detailed procedure of the frame interpolation method in this embodiment will be disclosed with reference to FIGS. 32 and 33.

Produced first is a support frame from a motion-compensated predictive coded signal, in step S150 shown in FIG. 32, in accordance with a flow chart shown in FIG. 33.

Decoded in step S160 shown in FIG. 33 is a motion-compensated predictive coded signal. The decoded signal is separated into a video stream and motion-vector information in step S161.

A first reference frame and a second reference frame are extracted from the video stream in step S162. The motion-vector information is used to detect a motion vector between the first and the second reference frame, as a first motion vector in step S163.

Block scanning starts in step S164. Obtained in step S165 is a predictive error corresponding to the first motion vector. It is then determined in step S166 whether or not the predictive error is larger than a reference value.

If larger (YES in step S166), a motion vector is obtained as the first motion vector from the first and second reference frames in step S167. The procedure moves onto step S168. If not larger or equal (NO in step S166), the procedure directly moves onto step S168.

The length of the first motion vector is scaled down to ½ to obtain a second motion vector in step S168.

Motion compensation is performed using the second motion vector, the first reference frame and the second reference frame in step S169.

It is determined in step S170 whether all blocks have been scanned. If not (NO in step S170), the procedure returns to step S165 to repeat the succeeding steps. If all blocks have been scanned (YES in step S170), the support frame production procedure ends.

Referring back to FIG. 32, pixels used in a support frame are detected to obtain a pixel filter in step S151, in accordance with the flow chart shown in FIG. 4, like the first embodiment.

The support frame is divided into several small blocks in step S152. Then, block scanning starts in step S153.

Searched for in step S154 are first small blocks in the first reference frame and second small blocks in the second reference frame with small blocks in the frame with no video data as the symmetrical center, thus selecting several motion-vector candidates in descending order of correlation.

A third motion vector is obtained from among the motion-vector candidates by examination using the support frame (step S155).

An image block in the first reference frame and another image block in the second reference frame, determined by the third motion vector are averaged. An average image block is then copied in a target block in the support frame (step S156).

It is determined in step S157 whether all blocks have been scanned. If not (No in step S156), the procedure returns to step S154 to repeat the succeeding steps. On the contrary, if all blocks have been scanned (YES in step S156), the procedure of generating an interpolated frame ends.

As disclosed, the fourth embodiment first obtains a support frame and then an interpolated frame, thus, like the first embodiment, being advantageous in producing high-quality interpolated frames, freeing from a gap or superimposition, and also from a background displayed on an image area on which the object should be displayed.

Fifth Embodiment

Disclosed next is a fifth embodiment according to the present invention.

This embodiment is related to a hold type display that continuously displays a current frame until a new image is written, like liquid crystal displays (LCD), electroluminescent displays and plasma displays.

Any method of frame interpolation in the above embodiments can be applied to the image displaying apparatus in this embodiment.

Usual hold type displays suffer blur images when a viewer watches a moving object, which causes problems on TVs equipped with this type of display.

Impulse driving and interpolation driving have been introduced to solve such problems on hold displaying while holding pixel potential in LCDs, etc.

Impulse driving is to avoid such blur images on LCDs by interpolating a black image between video frames (or backlight off), nevertheless, causing decrease in intensity drastically.

Interpolation driving is to avoid such blur images by interpolating a motion-compensated frame between video frames to achieve 120-Hz driving two times higher than 60-Hz driving, thus offering high-quality images with no decrease in intensity different from impulse driving.

The methods of frame interpolation in the first to fourth embodiments can be employed for producing such an interpolated frame, to restrict lowering of image quality, which otherwise occur like the known techniques.

Figure 34:
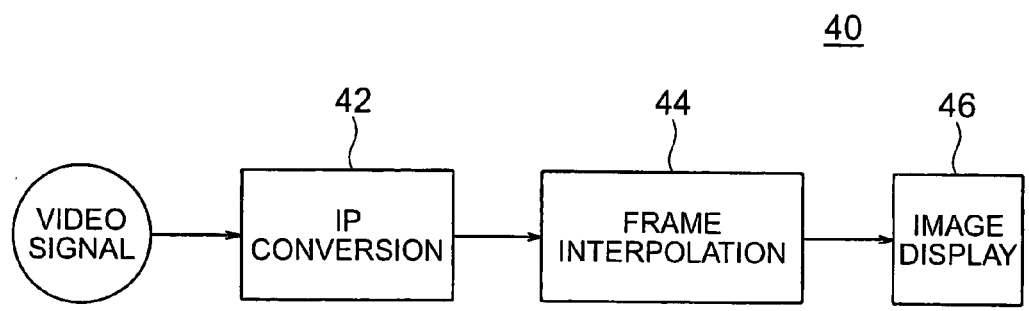
FIG. 34 is a schematic block diagram of a hold-type image displaying apparatus in a fifth embodiment according to the present invention.

Disclosed with reference to FIG. 34 is a hold-type image displaying apparatus 40 in the fifth embodiment.

The hold-type image displaying apparatus 40 is equipped with an IP converter 42, a flame interpolator 44, and a displaying unit 46.

The displaying unit 46 is a hold type display, such as, an LCD, an electroluminescent display, and a plasma display.

The IP converter 42 applies interlaced-to-progressive conversion to an input video signal. TV images may be input as being composed of odd- or even-number of lines that have been decimated from horizontal pixel lines. Such interlaced images have to be converted into progressive images with no decimation so that they can be displayed on the displaying unit 46.

When a progressive video signal is supplied, the flame interpolator 44 generates interpolated frames. Each frame is interpolated into the video signal to produce a progressive video signal. Any of the frame interpolation methods in the first to third embodiments can be applied to the flame interpolator 44.

The frame interpolation method in the fourth embodiment may be applied to a digitally compressed TV signal.

As disclosed, the any frame interpolation method in the first to third embodiments can be applied to LDC-equipped TVs under 120-Hz driving with interpolation of high-definition frames, to achieve high-quality image displaying with no blurs.

Sixth Embodiment

Disclosed next is a sixth embodiment of the present invention, which is a DVD player (moving-picture decoding apparatus) with the frame interpolation method in the first, second, third, or the fourth embodiment.

Movie contents are usually displayed with 24 frames per sec (24 Hz) whereas TV contents are displayed at 60 Hz. The number of frames per sec for movie contents is smaller than a half of those for TV contents. Scrolled videos of movie contents could exhibit unnatural movements, like slow-motion videos or photographic playback.

Movies are major contents for DVDs, so that DVDs could reproduce such unnatural movements. This problem is, however, overcome by any of the frame interpolation methods in the first to fourth embodiments, to increase the number of frames of movie contents, thus reproducing natural moving images at high quality with almost no errors which otherwise occur due to frame interpolation like the known techniques.

Figure 35:
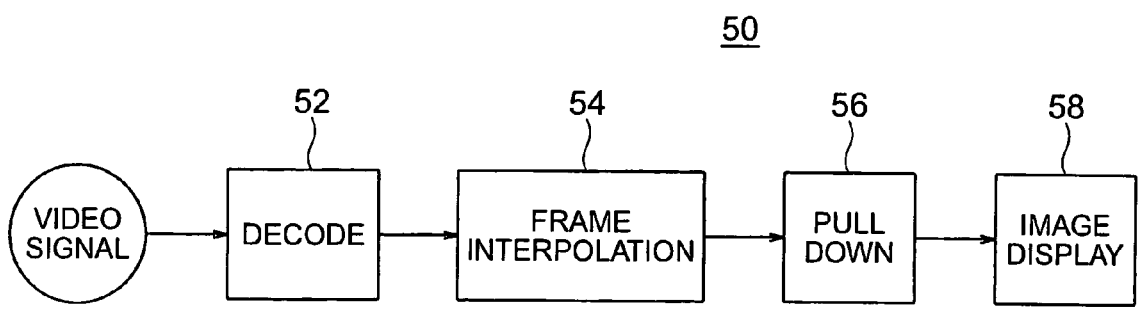
FIG. 35 is a schematic block diagram of a DVD player in a sixth embodiment according to the present invention.

The DVD player of the sixth embodiment will be disclosed with reference to FIG. 35.

The DVD player is equipped with a decoder 52, a frame interpolator 54, a pull-down unit 56, and a display 58.

Any of the frame interpolation methods in the first to fourth embodiments can be applied to the frame interpolator 54, which further applicable to DVD software on personal computers.

A video signal retrieved from a DVD via a pickup (not shown). The video signal (digital data) is supplied to the decoder 52 so that compressed data is decoded and reproduced as moving pictures.

The moving pictures are supplied to the frame interpolator 54, thus specific frames are produced and interpolated in the moving pictures. For example, one frame is interpolated between two consecutive original frames of 24-Hz moving pictures, thus converting the pictures into 48-Hz moving pictures.

The 48-Hz moving pictures are supplied to the pull-down unit 56 to be converted into 60-Hz moving pictures. In detail, two original frames are consecutively displayed per four frames so that four frames are converted into five frames, thus the 48-Hz moving pictures being up-converted into 60-Hz moving pictures.

Disclosed here is frame interpolation for up-converting 24-Hz moving-picture contents into 48-Hz contents. Not only that, for example, 24-Hz moving-picture contents can be converted into 120-Hz contents for a TV capable of displaying 120-Hz contents by the frame interpolation method in this invention, for high-quality images. This is achieved by interpolating four frames between consecutive two frames of 24-Hz moving pictures.

As disclosed, any of the frame interpolation methods in the first to fourth embodiments can be applied to DVD players, to interpolate high-definition frames in moving-picture contents to increase frames thereof, for natural and smooth moving pictures.

Seventh Embodiment

Disclosed next as a seventh embodiment is a medical display system.

Discussed below is displaying medical photographs taken with X-rays.

A human body is exposed to X-rays. An X-ray detector detects transmitted X-rays to take photographs of internal organs, etc.

In order to take such photographs, a human body has to be exposed to X-rays, thus less the X-rays, the less adverse effects to the human body. Nevertheless, too less X-rays cause noises on images that affect diagnosis. In actual photographing, the number of frames to be taken is decreased (for, example, 7.5 or 15 frames per sec) for less quantity of X-rays.

A small number of frames such as 7.5 or 15 frames per sec, however, offer unnatural images, like slow-motion videos or photographic playback.

This problem is solved by frame interpolation of the present invention to interpolate frames in photographed image signals, thus increasing the number frames of the signals to be reproduced for natural and smooth high-quality images.

Figure 36:
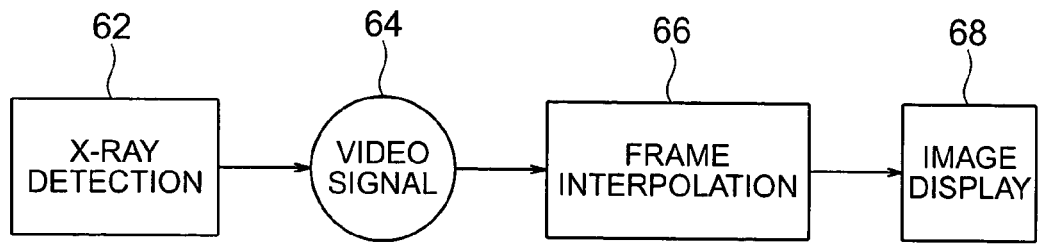
FIG. 36 is a schematic block diagram of a medical display system in a seventh embodiment according to the present invention.

A medical display system 60 in this embodiment will be disclosed with reference to FIG. 36.

An X-ray detector 62 detects X-rays transmitted though a human body, to output a video signal 64. The video signal 64 is supplied to a frame interpolator 66 that produces frames which are then interpolated in the signal 64. Any of the frame interpolation methods in the first to fourth embodiments can be applied to the frame interpolator 66. The frame-interpolated video signal is supplied to a display 68.

The frame interpolator 66 employing any of the frame interpolation methods in the first to fourth embodiments performs interpolation of high-definition frames to increase frames of photographed-image contents, thus offering natural and smooth high-quality images.

Eighth Embodiment

Disclosed next is a TV-conference system as an eighth Embodiment of the present invention.

High-quality images can be obtained through frame interpolation of the present invention for systems to transmit video signals in a narrow band, such as, TV-conference systems and mobile TVs.

Systems such as TV-conference systems and mobile TVs compress video signals to transmit the signals in a narrow band. Compression is performed with decimation of frames of moving pictures.

Decimation of frames (such as, to 15 frames per sec) however, causes unnatural movements to reproduced moving pictures.

This is solved by the frame interpolation method of the present invention to increase the number of frames to be displayed for natural moving pictures.

Figure 37:
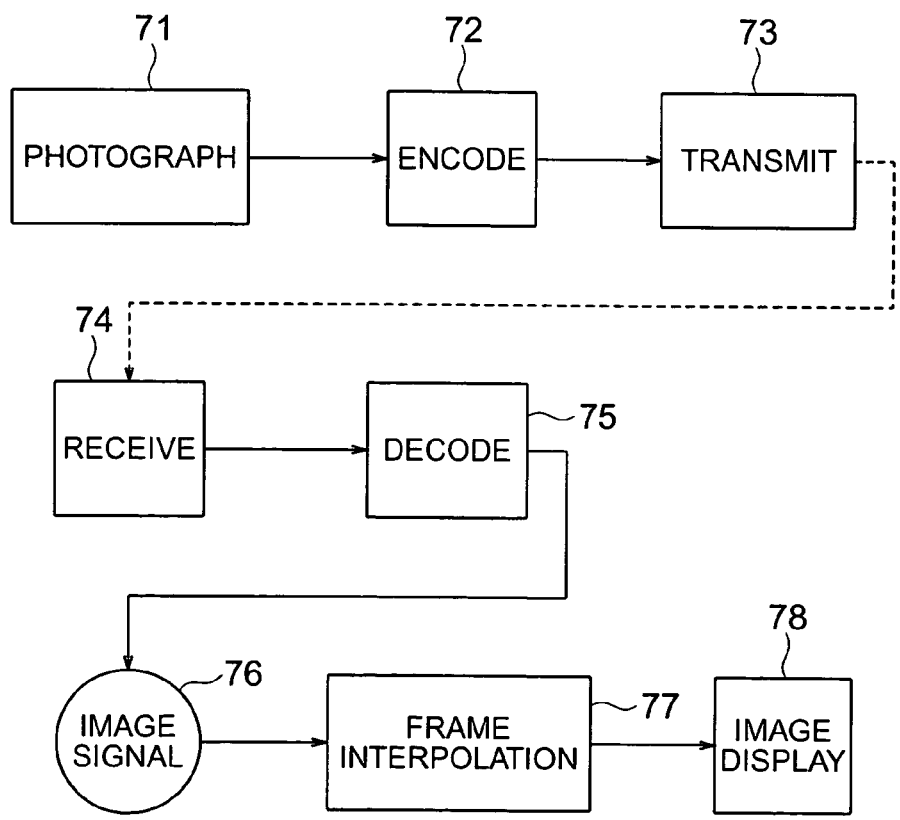
FIG. 37 is a schematic block diagram of a TV-conference system in an eighth embodiment according to the present invention.

A TV-conference system of this embodiment is disclosed with reference to FIG. 37.

A conference is photographed by a camera 71. A video signal output from the camera 71 is encoded by an encoder 72 with adjustments to the number of frames. The encoded video signal is then transmitted by a transmitter 73.

The transmitted video signal is received by a receiver 74 and then decoded by a decoder 75. A decoded video signal is supplied to a frame interpolator 77 employing one of the interpolation methods in the first to fourth embodiments. The frame interpolator 77 produces frame and interpolates them in the decoded video signal to increase the number of frames. The frame-interpolated video signal is supplied to a display 78, thus natural moving pictures being displayed thereon.

As disclosed, the TV-conference system employing one of the interpolation methods in the first to fourth embodiments increases the number of frames in contents with interpolation of high-definition frames to display natural and smooth high-quality images.

Ninth Embodiment

Figure 38:
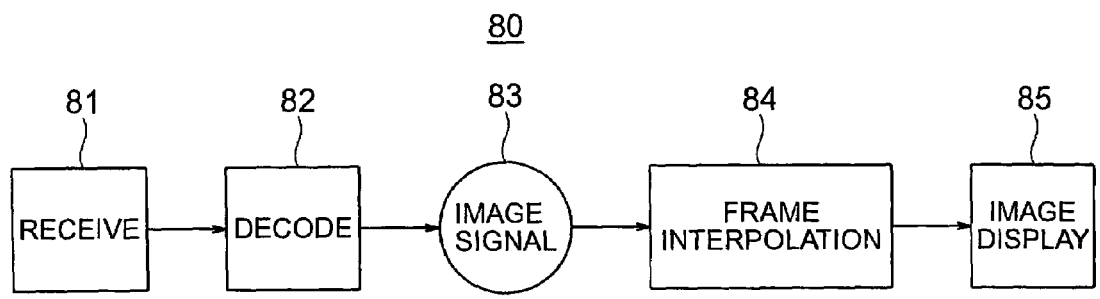
FIG. 38 is a schematic block diagram of a mobile TV system in a ninth embodiment according to the present invention.

Shown in FIG. 38 is a mobile TV system 80, a ninth embodiment of the present invention.

A video signal is received by a receiver 81 and then decoded by a decoder 82. A decoded video signal 83 is supplied to a frame interpolator 84 employing one of the interpolation methods in the first to fourth embodiments. The frame interpolator 84 produces frame and interpolate them in the decoded video signal to increase the number of frames. The frame-interpolated video signal is supplied to a display 85, thus natural moving pictures being displayed thereon.

As disclosed, the mobile TV system employing one of the interpolation methods in the first to fourth embodiments increases the number of frames in contents with interpolation of high-definition frames to display natural and smooth high-quality images.

Tenth Embodiment

The interpolation method according to the present invention also offers high-quality images when applied, for example, to HDD recorders in which movie contents are once recorded (encoded) in storage and reproduced (decoded) later therefrom.

Most users watch contents later once it is recorded. About 24 hours pass when he or she watches contents in the following evening if it is recorded in the previous evening. The 24-hour time lag can be used for the frame interpolation method of the present invention to offer high-quality images.

Figure 39:
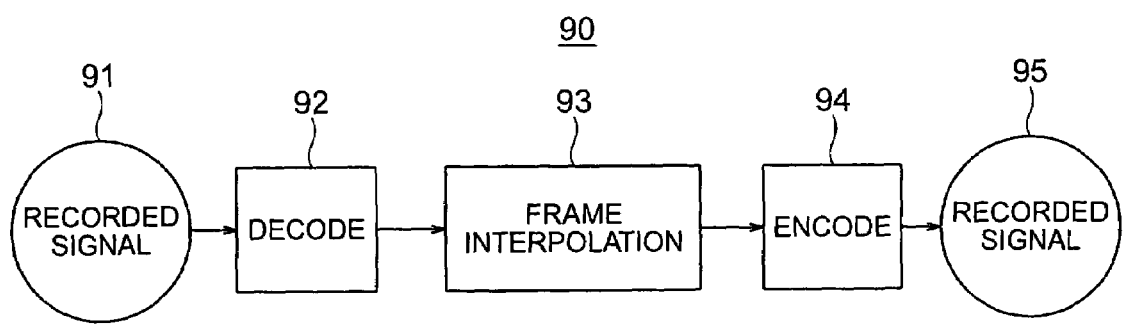
FIG. 39 is a schematic block diagram of an HDD recorder in a tenth embodiment according to the present invention.

Disclosed with reference to FIG. 39 is a high-quality HDD recorder 90 in this embodiment.

Encoded data 91 is a video signal that has already been recoded by a recording apparatus (not shown). The encoded data 91 is supplied to a decoder 92, thus the video signal being decoded.

The decoded video signal is supplied to a frame interpolator 93 employing one of the interpolation methods in the first to fourth embodiments. The frame interpolator 93 produces frame and interpolates them in the decoded video signal to increase the number of frames.

The frame-interpolated video signal is supplied to an encoder 94 to be encoded again. A re-encoded video signal 95 is stored in an HDD (not shown).

The frequency of frame interpolation may be varied in accordance with a period from a moment at which contents are recorded to another moment at which the recorded contents are viewed.

If the period is long, fine frame interpolation can be performed even though it takes long. If it is short, however, rough frame interpolation is available because it does not take long. Thus, appropriate frame interpolation can be performed in accordance with the period from recording to viewing.

As disclosed, any one of the interpolation methods in the first to fourth embodiments can be applied to a recording apparatus, such as, an HDD recorder, to increase the number of frames of contents with interpolation of high-definition frames during the period from recording to viewing, thus offering natural and smooth images.

As disclosed in detail, the present invention achieves production of high-definition frames for interpolation.

It is further understood by those skilled in the art that each foregoing description is an embodiment of the disclosed method or apparatus and that various change and modification may be made in the invention without departing from the spirit and scope thereof.

What is claimed is:

1. A frame interpolation method comprising:
    estimating a first motion vector by using a first frame and a second frame that follows the first frame;
    generating a support frame from at least either the first or the second frame by using the first motion vector;
    dividing the support frame into a plurality of small blocks;
    estimating motion vector candidates by using the first and second frames, in relation to each of the small blocks;
    examining a small block on the first frame, a small block on the second frame and the small blocks on the support frame, the small block on the first frame and the small block on the second frame corresponding to each of motion vector candidates;
    selecting a second motion vector from the motion vector candidates, the second motion vector pointing the small block on the first frame and the small block on the second frame which have the highest correlation with each of the small blocks on the support frame; and
    generating an interpolated frame from at least either the first or the second frame by using the second motion vector.

2. The frame interpolation method according to claim 1, wherein the generating of the support frame includes:
    scale-converting a length of the first motion vector based on time at which the frame is interpolated; and
    generating the support frame by motion compensation using the scale-converted first motion vector.

3. The frame interpolation method according to claim 1, wherein the estimating of motion-vector candidates employs forward motion estimation, backward motion estimation, or bi-directional motion estimation.

4. The frame interpolation method according to claim 1 further comprising:
    detecting pixels with pixel value from the support frame, wherein the examining of the image block computes correlation by using only the detected pixels.

5. The frame interpolation method according to claim 1, wherein the estimating of motion vector candidates includes:
    dividing a third frame with no image data into a plurality of small blocks of square grid;
    computing correlation between a first small block in the first frame and a second small block in the second frame, the first and second small blocks being located at symmetrical positions as a block pair with one of the small blocks of the third frame as a symmetrical center, correlation being computed for all block pairs in the first and second frames; and
    selecting vectors connecting small blocks in the block pairs as the motion-vector candidates in descending order of correlation.

6. The frame interpolation method according to claim 1, wherein the examining of the image block includes:
    obtaining a first small block from the first frame and a second small block from the second frame, the first and second small blocks determined by each motion-vector candidate;
    obtaining a third small block from the support frame at a location corresponding to the motion vector candidates;
    computing a first correlation between the first and third small blocks;
    computing a second correlation between the second and third small blocks;

detecting the second motion vector from the motion-vector candidates, having maximum correlation that is sum of the first and second correlations.

7. A frame interpolation method comprising:
generating a support frame from by using a first frame and a second frame that follows the first frame;
dividing the support frame into a plurality of small blocks;
estimating at least one motion-vector candidate group by recursive searching for motion-vector candidates in each small block of the support frame;
examining the motion-vector candidate group by using the support frame, to obtain a first motion-vector group and a first unmatched-filter group; and
generating an interpolated frame by motion compensation using the first motion-vector group, the first unmatched-filter group, and the first and the second frames.

8. The frame interpolation method according to claim 7, wherein the producing of the support frame includes:
dividing the first frame into a plurality of first small blocks;
estimating a second motion-vector group and a second unmatched-filter group by recursive searching to each first small block;
scale-converting a length of the second motion-vector group based on time at which the frame is interpolated, to obtain a third motion-vector group; and
generating the support frame by motion compensation using the third motion-vector group, the second unmatched-filer group, and the first and second frames.

9. The frame interpolation method according to claim 8, wherein the estimating of at least one motion-vector candidates employs forward motion estimation, backward motion estimation, or bi-directional motion estimation.

10. The frame interpolation method according to claim 7, wherein the estimating of at least one motion-vector candidates includes:
computing correlation between a first small block in the first frame and a second small block in the second frame, the first and second small blocks being located at symmetrical positions as a block pair with one of small blocks in the third frame as a symmetrical center, correlation being computed for all block pairs in the first and second frames; and
estimating the motion vector candidates from vectors connecting small blocks in the block pairs in descending order of correlation.

11. A frame interpolation method comprising:
decoding a motion-compensated predictive signal to separate the signal into a video bitstream and motion-vector information;
extracting a first and a second frame and a corresponding first motion vector from the video bitstream, thus generating a support frame from the first and second frames by using the first motion vector;
estimating motion-vector candidates from the first and second frames in relation to each block in the support frame;
examining an image block in the first frame and an image block in the second frame, and an image block in the support frame, to select one of the motion vector candidates as a second motion vector having the highest correlation as a second motion vector; and
generating an interpolated frame from image blocks, in the first and second frames, determined by the second motion vector.

12. The frame interpolation method according to claim 11, the extracting of first and second frames includes obtaining a predictive error corresponding to decoded first and second frames and estimating the first motion vector from the decoded first and second frames if the predictive error is larger than a reference value.

13. A frame interpolation apparatus comprising:
a motion vector estimating unit configured to estimate a first motion vector by using a first frame and a second frame;
a support frame generating unit configured to produce a supplemental frame from at least either the first or the second frame by using the first motion vector;
a supplemental frame dividing unit configured to divide the support frame into a plurality of small blocks;
a motion vector candidate estimating unit configured to estimate motion vector candidates by using the first frame and second frames, in relation to the small blocks;
a examining unit configured to examine a first small block on the first frame, a second small block on the second frame and the small block on the supplemental frame, the first small block and the second small block corresponding to each of the motion vector candidates;
a selecting unit configured to select a second motion vector from the motion vector candidates, the second motion vector pointing the first and second small blocks which have the highest correlation with each of the small blocks; and
a interpolated frame generating unit configured to generate an interpolated frame from at least either the first or the second frame by using the second motion vector.

14. A television set comprising:
an interlaced-to-progressive converter configured to convert an input video signal into a progressive video signal; and
a frame interpolator configured to interpolate an interpolated frame, which is generated from the progressive video signal using the frame interpolation apparatus according to claim 13, into the progressive video signal.

15. A motion picture decoding apparatus comprising:
a retriever configured to retrieve coded data of motion pictures from a storage;
a decoder configured to decode the coded data of motion pictures; and
a frame interpolator configured to interpolate an interpolated frame, which is generated from the motion pictures using the frame interpolation apparatus according to claim 13, into the motion pictures; and
a display unit configured to display the frame-interpolated decoded data of motion pictures.

16. A medical display system comprising a frame interpolator configured to interpolate an interpolated frame of a motion-picture signal, which is generated using the frame interpolation apparatus according to claim 13, into the motion-picture signal when receiving the motion-picture signal sent via an X-ray detector.

17. A television conference system comprising:
a camera configured to film a motion picture, thus producing a video signal;
an encoder configured to encode the video signal, thus generating coded data;
a transmitter configured to transmit the coded data;
a receiver configured to receive the transmitted coded data;

a decoder configured to decode the received coded data, thus reproducing the video signal; and a frame interpolator configured to interpolate an interpolated frame, which is generated from the video signal reproduced by the decoder using the frame interpolation apparatus according to claim 13, into the video signal.

18. A television set comprising:

a receiver configured to receive coded data of motion pictures;

a decoder configured to decode the received coded data, thus reproducing the motion pictures;

a frame interpolator configured to interpolate an interpolated frame, which is generated from the motion pictures using the frame interpolation apparatus according to claim 13, into the motion pictures; and a display unit configured to display the frame-interpolated motion pictures.

19. A moving-picture recording apparatus comprising:

an read unit configured to read a video-motion picture;

a frame interpolator configured to interpolate an interpolated frame, which is generated from the video-motion picture using the frame interpolation apparatus according to claim 13, into the video-motion picture;

an encoder configured to encode the frame-interpolated motion picture, thus generating coded data; and a recorder configured to record the coded data in a storage.

* * * * *